United States Patent
Kunieda et al.

(10) Patent No.: US 12,323,564 B2
(45) Date of Patent: Jun. 3, 2025

(54) IMAGE PROCESSING APPARATUS AND IMAGE PROCESSING METHOD THAT EMBEDS INFORMATION USING A PATTERN WITH DIRECTIVITY AND A PATTERN WITHOUT DIRECTIVITY

(71) Applicant: Canon Kabushiki Kaisha, Tokyo (JP)

(72) Inventors: Hiroyasu Kunieda, Kanagawa (JP); Akitoshi Yamada, Kanagawa (JP); Yoichi Kashibuchi, Kanagawa (JP); Jun Nagai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/174,718

(22) Filed: Feb. 27, 2023

(65) Prior Publication Data

US 2023/0291858 A1    Sep. 14, 2023

(30) Foreign Application Priority Data

Mar. 8, 2022 (JP) ................................. 2022-035511

(51) Int. Cl.
*H04N 1/32* (2006.01)

(52) U.S. Cl.
CPC ..... *H04N 1/32299* (2013.01); *H04N 1/32267* (2013.01); *H04N 1/32309* (2013.01); *H04N 1/3232* (2013.01); *H04N 1/32352* (2013.01); *H04N 2201/0094* (2013.01)

(58) Field of Classification Search
CPC .................................... H04N 1/32149–32352
See application file for complete search history.

(56) References Cited

U.S. PATENT DOCUMENTS

| | | | | |
|---|---|---|---|---|
| 7,706,026 B2 * | 4/2010 | Ishii | ................... | G06V 30/1448 358/450 |
| 7,999,973 B2 * | 8/2011 | Nakata | ............... | H04N 1/00867 380/54 |
| 8,300,882 B2 * | 10/2012 | Das Gupta | ......... | H04N 1/32352 382/100 |
| 8,300,925 B2 * | 10/2012 | Kunieda | ............... | G06T 1/0028 382/209 |
| 8,593,698 B2 * | 11/2013 | Simske | ............. | H04N 1/00045 382/137 |

(Continued)

FOREIGN PATENT DOCUMENTS

| | | |
|---|---|---|
| JP | 2008-283269 A | 11/2008 |
| JP | 2012-083485 A | 4/2012 |

*Primary Examiner* — Barbara D Reinier
(74) *Attorney, Agent, or Firm* — Venable LLP

(57) ABSTRACT

An image processing apparatus includes: a first obtaining unit configured to obtain an original image; a second obtaining unit configured to obtain region information indicating first and second regions, the first region read in reading of a print original to have a higher density than the second region, the second region read in the reading to have a lower density than the first region; an embedding unit configured to embed information in the original image by embedding a pattern with a directivity in the first region and embed, in the second region, a pattern in which the number of pixels printed adjacent to printed pixels is smaller than that in the first region; and a control unit configured to perform control of outputting the print original by using a print image in which the patterns of the first and second regions are embedded by the embedding unit.

18 Claims, 19 Drawing Sheets

PATTERN EXPRESSING DOCUMENT ID=0, APPARATUS INFORMATION=0

PATTERN EXPRESSING DOCUMENT ID=0, APPARATUS INFORMATION=1

(56) References Cited

U.S. PATENT DOCUMENTS

| | | | |
|---|---|---|---|
| 2004/0051885 A1* | 3/2004 | Matsunoshita | G06T 1/005 358/1.9 |
| 2007/0127771 A1* | 6/2007 | Kaneda | H04N 1/32315 382/100 |
| 2015/0146262 A1* | 5/2015 | Fan | H04N 1/32309 358/3.28 |

* cited by examiner

WATERMARK DATA

| 0 | 0 | 0 | 0 | 0 | 0 | 0 | -64 |
|---|---|---|---|---|---|---|---|
| 0 | 0 | 0 | 0 | 0 | 0 | -64 | 0 |
| 0 | 0 | 0 | 0 | 0 | -64 | 0 | 0 |
| 0 | 0 | 0 | 0 | -64 | 0 | 0 | 0 |
| 0 | 0 | 0 | -64 | 0 | 0 | 0 | 0 |
| 0 | 0 | -64 | 0 | 0 | 0 | 0 | 0 |
| 0 | -64 | 0 | 0 | 0 | 0 | 0 | 0 |
| -64 | 0 | 0 | 0 | 0 | 0 | 0 | 0 |

MASK FOR CREATING CHANGE INDICATING EMBEDDED INFORMATION 0 IN LATENT IMAGE REGION

FIG.7A

| -64 | 0 | 0 | 0 | 0 | 0 | 0 | 0 |
|---|---|---|---|---|---|---|---|
| 0 | -64 | 0 | 0 | 0 | 0 | 0 | 0 |
| 0 | 0 | -64 | 0 | 0 | 0 | 0 | 0 |
| 0 | 0 | 0 | -64 | 0 | 0 | 0 | 0 |
| 0 | 0 | 0 | 0 | -64 | 0 | 0 | 0 |
| 0 | 0 | 0 | 0 | 0 | -64 | 0 | 0 |
| 0 | 0 | 0 | 0 | 0 | 0 | -64 | 0 |
| 0 | 0 | 0 | 0 | 0 | 0 | 0 | -64 |

MASK FOR CREATING CHANGE INDICATING EMBEDDED INFORMATION 1 IN LATENT IMAGE REGION

FIG.7B

| -64 | 0 | 0 | 0 | -64 | 0 | 0 | 0 |
|---|---|---|---|---|---|---|---|
| 0 | 0 | 0 | 0 | 0 | 0 | 0 | 0 |
| 0 | 0 | -64 | 0 | 0 | 0 | -64 | 0 |
| 0 | 0 | 0 | 0 | 0 | 0 | 0 | 0 |
| -64 | 0 | 0 | 0 | -64 | 0 | 0 | 0 |
| 0 | 0 | 0 | 0 | 0 | 0 | 0 | 0 |
| 0 | 0 | -64 | 0 | 0 | 0 | -64 | 0 |
| 0 | 0 | 0 | 0 | 0 | 0 | 0 | 0 |

MASK FOR CREATING CHANGE INDICATING BACKGROUND REGION

FIG.7C

PRINT PATTERN
EXPRESSING EMBEDDED INFORMATION 0
IN LATENT IMAGE REGION

PRINT PATTERN
EXPRESSING EMBEDDED INFORMATION 1
IN LATENT IMAGE REGION

PRINT PATTERN
EXPRESSING BACKGROUND REGION

WATERMARK DATA

|   |   |   |   |   |   |   |   |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

MASK FOR CREATING CHANGE INDICATING 0

FIG.11A

|   |   |   |   |   |   |   |   |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | -64 | -64 | 0 | 0 | 0 |
| 0 | 0 | -64 | -64 | -64 | -64 | 0 | 0 |
| 0 | 0 | -64 | -64 | -64 | -64 | 0 | 0 |
| 0 | 0 | 0 | -64 | -64 | 0 | 0 | 0 |
| 0 | 0 | 0 | 0 | 0 | 0 | 0 | 0 |
| 0 | 0 | 0 | 0 | 0 | 0 | 0 | 0 |

MASK FOR CREATING CHANGE INDICATING 1

FIG.11B

PATTERN EXPRESSING 0

PATTERN EXPRESSING 1

MULTIPLEXED PRINT PATTERN

MULTIPLEXED PATTERN

PATTERN
EXPRESSING DOCUMENT ID=0,
APPARATUS INFORMATION=0

PATTERN
EXPRESSING DOCUMENT ID=0,
APPARATUS INFORMATION=1

PATTERN
EXPRESSING DOCUMENT ID=1,
APPARATUS INFORMATION=0

PATTERN
EXPRESSING DOCUMENT ID=1,
APPARATUS INFORMATION=1

| 1/9 | 1/9 | 1/9 |
|---|---|---|
| 1/9 | 1/9 | 1/9 |
| 1/9 | 1/9 | 1/9 |

BLUR FILTER USED IN EXTRACTION OF
APPARATUS INFORMATION

FIG.15

PATTERN
EXPRESSING DOCUMENT ID=0,
APPARATUS INFORMATION=0

PATTERN
EXPRESSING DOCUMENT ID=0,
APPARATUS INFORMATION=1

PATTERN
EXPRESSING DOCUMENT ID=1,
APPARATUS INFORMATION=0

PATTERN
EXPRESSING DOCUMENT ID=1,
APPARATUS INFORMATION=1

| 0 | 0 | 1/3 |
|---|---|---|
| 0 | 1/3 | 0 |
| 1/3 | 0 | 0 |

FILTER
FOR DETECTING 0 OF
SHAPE EMBEDDING

FIG.17A

| 1/3 | 0 | 0 |
|---|---|---|
| 0 | 1/3 | 0 |
| 0 | 0 | 1/3 |

FILTER
FOR DETECTING 1 OF
SHAPE EMBEDDING

FIG.17B

PATTERN
EXPRESSING DOCUMENT ID=0,
APPARATUS INFORMATION=0

PATTERN
EXPRESSING DOCUMENT ID=0,
APPARATUS INFORMATION=1

PATTERN
EXPRESSING DOCUMENT ID=1,
APPARATUS INFORMATION=0

PATTERN
EXPRESSING DOCUMENT ID=1,
APPARATUS INFORMATION=1

PATTERN
EXPRESSING DOCUMENT ID=0,
APPARATUS INFORMATION=0

PATTERN
EXPRESSING DOCUMENT ID=0,
APPARATUS INFORMATION=1

PATTERN
EXPRESSING DOCUMENT ID=1,
APPARATUS INFORMATION=0

PATTERN
EXPRESSING DOCUMENT ID=1,
APPARATUS INFORMATION=1

IMAGE PROCESSING APPARATUS AND IMAGE PROCESSING METHOD THAT EMBEDS INFORMATION USING A PATTERN WITH DIRECTIVITY AND A PATTERN WITHOUT DIRECTIVITY

BACKGROUND OF THE INVENTION

Field of the Invention

The present disclosure relates to a technique of handling information embedded in a printed original (hereinafter, referred to as print original).

Description of the Related Art

There is known a printing apparatus that prints a watermark image on a sheet in such a way that visual determination of the watermark image can be performed to suppress forgery of a business form, a receipt, or the like. Japanese Patent Laid-Open No. 2012-083485 (hereinafter, referred to as Literature 1) discloses a technique of reducing a difference in density of a watermark image caused by a difference in type of sheet. Meanwhile, there is known an image process of embedding additional information in an image to prevent forgery using a reading device and the like. Japanese Patent Laid-Open No. 2008-283269 (hereinafter, referred to as Literature 2) discloses an information embedding method that is robust and that can achieve a certain level of image quality.

SUMMARY OF THE INVENTION

An information processing apparatus according to one aspect of the present disclosure includes: a first obtaining unit configured to obtain an original image; a second obtaining unit configured to obtain region information indicating a first region and a second region, the first region read in reading of a print original to have a higher density than the second region, the second region read in the reading of the print original to have a lower density than the first region; an embedding unit configured to embed information in the original image by embedding a pattern with a directivity in the first region and embed, in the second region, a pattern in which the number of pixels printed adjacent to printed pixels is smaller than the number of pixels printed adjacent to printed pixels in the first region; and a control unit configured to perform control of outputting the print original by using a print image in which the pattern of the first region and the pattern of the second region are embedded by the embedding unit.

Further features of the present invention will become apparent from the following description of exemplary embodiments with reference to the attached drawings.

BRIEF DESCRIPTION OF THE DRAWINGS

FIGS. 7A to 7C are diagrams illustrating examples of masks;

FIG. 11A to 11B are diagrams illustrating examples of masks;

FIG. 15 is a diagram illustrating an example of a filter;

FIGS. 17A and 17B are diagrams illustrating examples of filters;

DESCRIPTION OF THE EMBODIMENTS

Assume a case where the watermark printing described in Literature 1 and the embedding process described in Literature 2 are applied to the same region on a print sheet. In this case, a density difference between a background region and a latent image region of the watermark printing in copying of the print sheet is small. As a result, visual readability decreases, and functions of the watermark printing decrease.

Preferable embodiments of the present disclosure are described below in detail with reference to the attached drawings. Note that the embodiments described below do not limit the matters of the present disclosure, and not all of combinations of features described in the following embodiments are necessarily essential for solving means of the present disclosure.

First Embodiment

Figure 1:
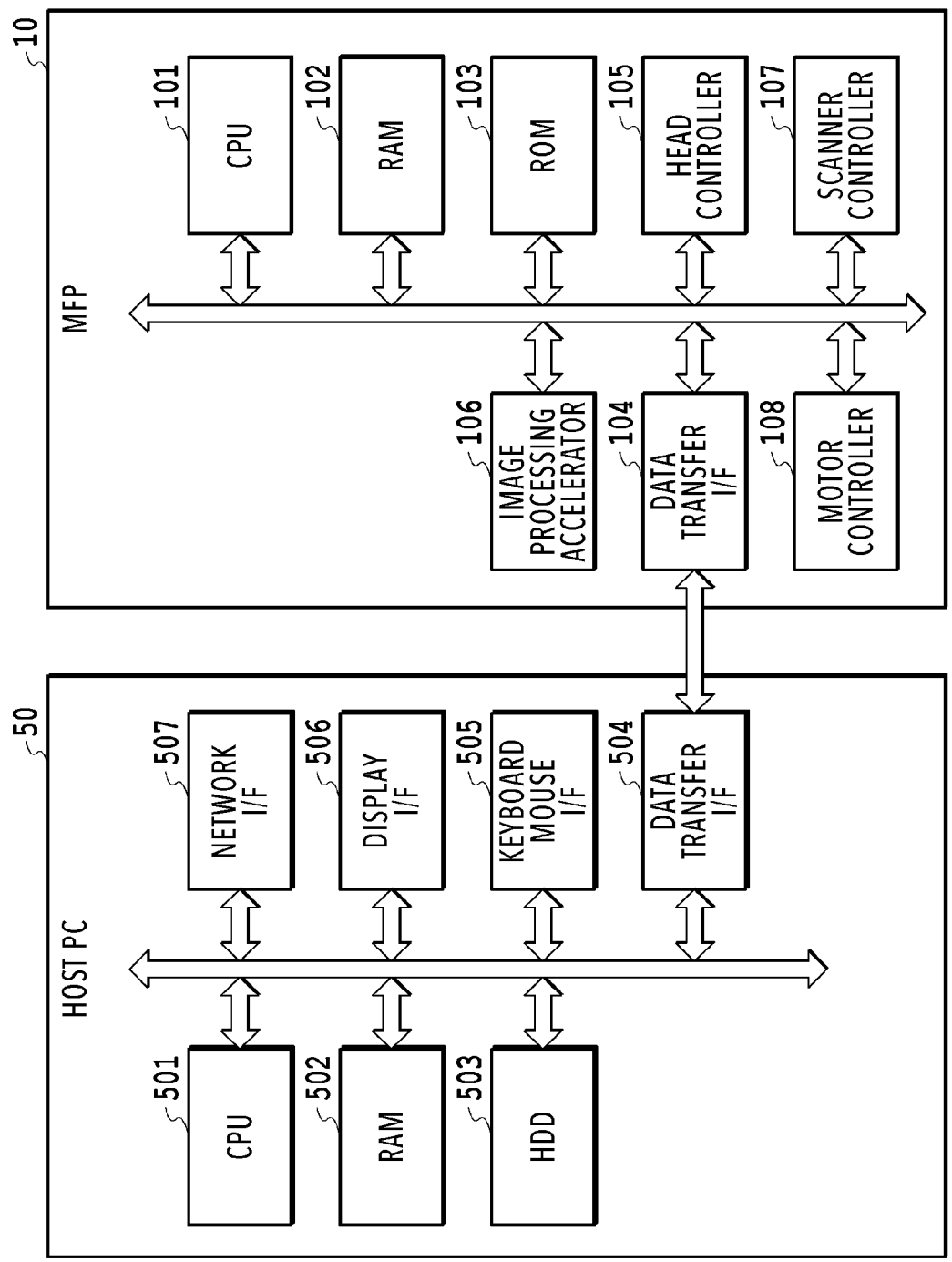
FIG. 1 is a block diagram illustrating a configuration of a printing system.

FIG. 1 is a block diagram illustrating a configuration of a printing system according to the present embodiment. The printing system of the embodiment includes a host PC 50 and an MFP 10. The host PC 50 and the MFP 10 are configured to be communicable with each other. The MFP 10 is a multi-function printer that is a printing apparatus. The MFP 10 generally refers to a printer that has multiple functions of a printer function and a scanner function and, in many cases, also has a copy function implemented by causing both functions to collaborate with each other. The host PC 50 is a host apparatus of the MFP 10, and is, for example, an information processing apparatus such as a personal computer. In the present embodiment, as described later, an image process of embedding information in a print original and an image process of extracting the information embedded in the print original are performed. In the present embodiment, both of the host PC 50 and the MFP 10 may function as an image processing apparatus that performs these image processes. A hardware configuration of each of the MFP 10 and the host PC 50 is described below.

Figure 2:
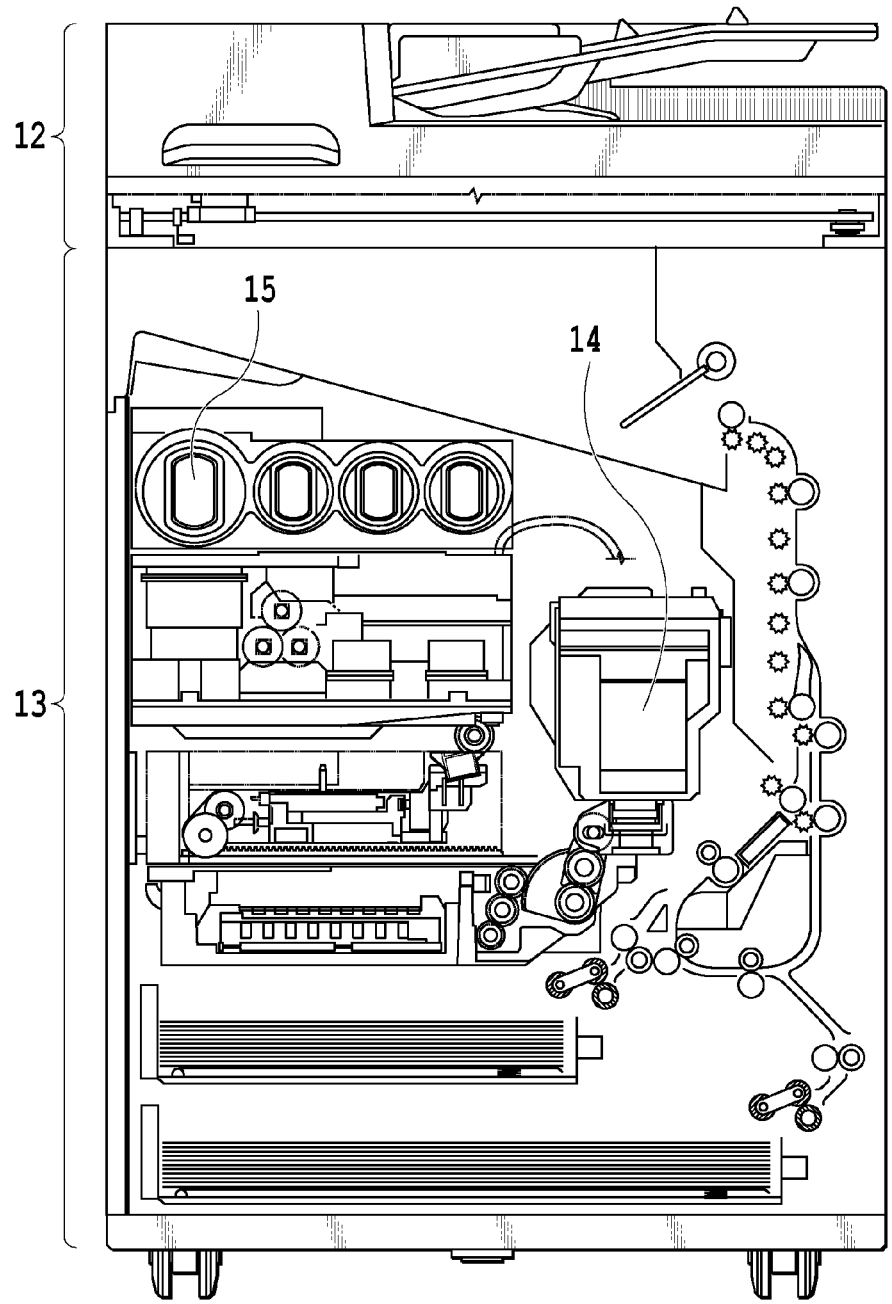
FIG. 2 is a view illustrating an example of an outer appearance of an MFP.

FIG. 2 is a diagram illustrating an example of an outer appearance of the MFP 10. A printing method of the MFP 10 in the present embodiment is an inkjet method. Moreover, the MFP 10 includes a scanner unit 12 and a print unit 13. The print unit 13 includes a print head 14 and an ink tank unit 15. The print head 14 ejects inks according to print data. The ink tank unit 15 stores inks to be supplied to the print head 14. The inks stored in the present embodiment are inks of cyan, magenta, yellow, and black. Note that examples of the inks are not limited to these, and an ink of a special color or the like may be separately held depending on am apparatus model.

Returning to the FIG. 1, the description of the hardware configuration continues. The host PC 50 includes a CPU 501, a RAM 502, an HDD 503, a data transfer I/F 504, a keyboard mouse I/F 505, a display I/F 506, and a network I/F 507.

The CPU 501 executes a process according to programs held in the HDD 503 or the RAM 502. The RAM 502 is a volatile storage, and temporarily holds programs and data. The HDD 503 is a non-volatile storage, and holds programs and data. The data transfer interface (I/F) 504 controls exchange of data with the MFP 10. Wired connection such as USB, IEEE 1394, or LAN and wireless connection such as Bluetooth or Wi-Fi can be used as a connection method for this data exchange. The keyboard mouse interface (I/F) 505 is an I/F that controls a human interface device (HID) such as a keyboard or a mouse. A user can perform input through the keyboard mouse I/F 505. The display interface (I/F) 506 controls displaying in a display (not illustrated). The network interface (I/F) 507 connects the host PC 50 to an external network, communicates with one or multiple external PCs, and makes a check request and a result request of a document ID, a request of document data, and the like. Note that the example illustrated in FIG. 1 is merely an example, and the host PC 50 may be any apparatus that functions as the information processing apparatus. For example, a smartphone, a table terminal, or the like may be used as the information processing apparatus.

The MFP 10 includes a CPU 101, a RAM 102, a ROM 103, a data transfer I/F 104, a head controller 105, and an image processing accelerator 106. The MFP 10 also includes a scanner controller 107 and a motor controller 108.

The CPU 101 executes processes to be described later in FIGS. 3A and 3B and beyond, according to programs held in the ROM 103 or the RAM 102. The RAM 102 is a volatile storage, and temporarily holds programs and data. The ROM 103 is a non-volatile storage, and can hold table data and programs used in the processes described later in FIGS. 3A and 3B and beyond.

The data transfer interface (I/F) 104 controls exchange of data with the host PC 50. The head controller 105 controls a heating operation of heaters mounted in the print head 14 based on the print data to eject the inks. Specifically, the head controller 105 may be configured to read control parameters and the print data from predetermined addresses in the RAM 102. In the case where the CPU 101 writes the control parameters and the print data to the predetermined addresses in the RAM 102, the head controller 105 activates a process and performs the heating operation of the heaters mounted in the print head 14. The image processing accelerator 106 is formed of hardware, and executes image processes at higher speed than the CPU 101. Specifically, the image processing accelerator 106 may be configured to read parameters and data necessary for the image processes from predetermined addresses in the RAM 102. In the case where the CPU 101 writes the parameters and the data to the predetermined addresses in the RAM 102, the image processing accelerator 106 is activated and performs a predetermined image process. Note that the image processing accelerator 106 is not necessarily an essential element, and the aforementioned image processes may be executed only in processes by the CPU 101 depending on specifications of the printer or the like. Moreover, although description is given by using the inkjet printing apparatus that prints images by ejecting the inks as an example of the printing apparatus, a printing apparatus that applies inks to a medium in another method may be used. Moreover, an electrophotographic printing apparatus that prints images by using toners may be used.

The scanner controller 107 controls the scanner unit 12 that functions as a reading apparatus. For example, the scanner controller 107 instructs the scanner unit 12 to irradiate an original with light and transmit light amount information obtained by catching reflected light with an imaging element such as a CCD to the scanner controller 107. Specifically, in the case where the CPU 101 writes control parameters and a read data write-out address in predetermined addresses of the RAM 102, the scanner controller 107 activates a process. Then, the scanner controller 107 performs light emission control of an LED mounted in the scanner unit 12, a process of obtaining the light amount information from the scanner unit 12, and a process of writing the light amount information after the read data write-out address in the RAM 102.

The motor controller 108 controls motor operations of not-illustrated multiple motor units. The motors are used in the case where the print head 14 is moved relative to a print sheet, the case where the scanner unit 12 is moved relative to a read original, and similar cases. Moreover, some MFPs include a motor for maintenance of the print head.

Figure 3A:
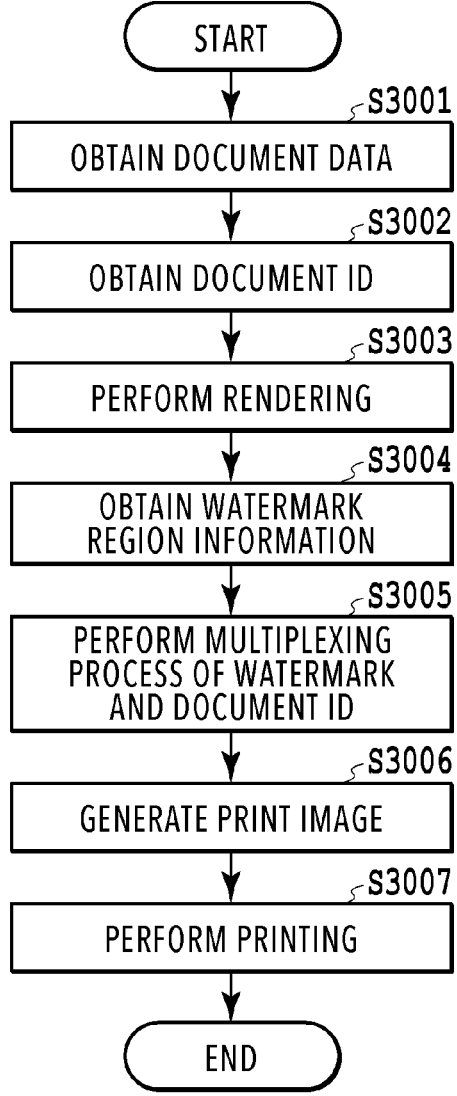
FIGS. 3A and 3B are flowcharts explaining an information embedding process and an information extracting process.
Figure 3B:
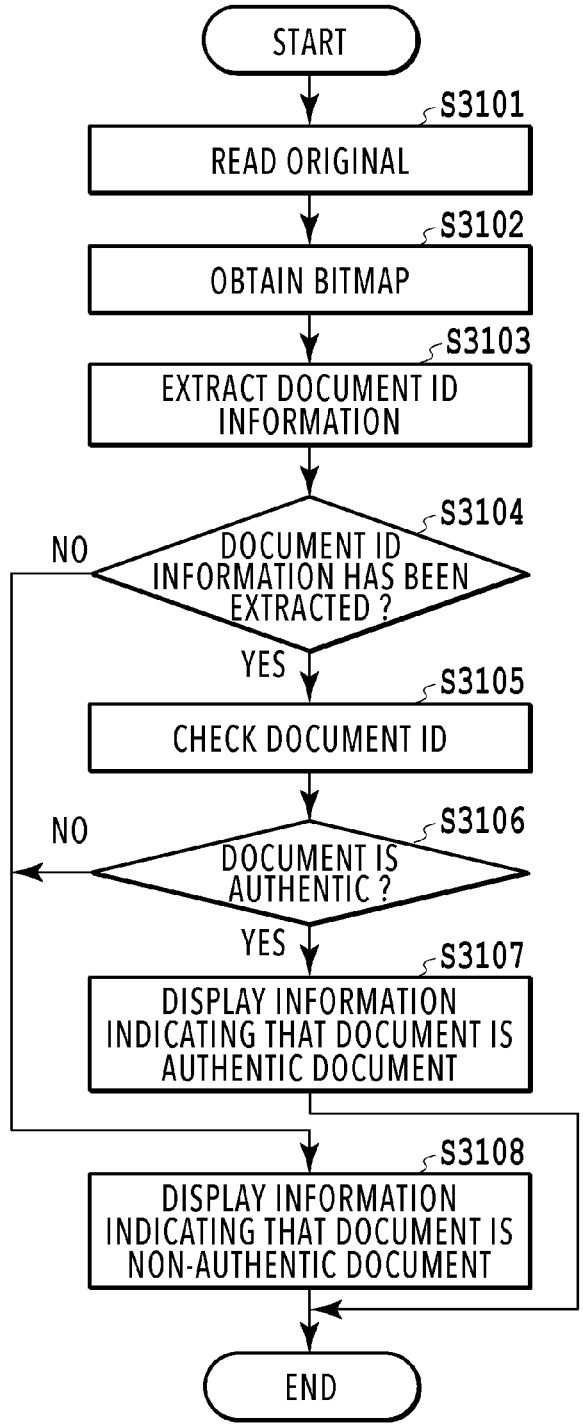

FIGS. 3A and 3B are flowcharts explaining an information embedding process and an information extracting process of the document ID and a watermark in the present embodiment. The CPU 101 of the MFP 10 performs the series of processes illustrated in the flowcharts of FIGS. 3A and 3B by loading program codes stored in the ROM 103 or the like onto the RAM 102 and executing the program codes. Note that sign "S" in the description of each process means step in the flowcharts (same applies in the present description). FIG. 3A is a flowchart of the information embedding process. FIG. 3B is a flowchart of the information extracting process. FIGS. 3A and 3B are processes separately and independently performed. Note that the host PC 50 may perform all processes illustrated in FIGS. 3A and 3B. In the case where the host PC 50 performs all processes, a print process (S3007) and an original read process (S3101) to be described later may be replaced by, for example, a print command output process and an original read command output process from the host PC 50 to the MFP 10. Moreover, the configuration may be such that the host PC 50 performs some of the processes illustrated in FIGS. 3A and 3B and the MFP 10 performs the other processes. For example, the configuration may be such that the host PC 50 performs processes from S3001 to S3006 and the MFP 10 performs the process of S3007 in FIG. 3A. Furthermore, the configuration may be such that the MFP 10 performs the process of S3101 and the host PC 50 performs the processes from S3102 to S3108 in FIG. 3B. Description is given below by using an example in which the MFP 10 performs the processes illustrated in FIGS. 3A and 3B.

<Information Embedding Process>

First, the information embedding process is described. In the present embodiment, description is given of an information embedding process in which an embedding process of embedding authentic document ID information and watermark printing are combined. The authentic document ID information is ID information indicating that the corresponding document is an authentic document. Hereinafter, the authentic document ID information is also simply referred to as document ID. The document ID is also an ID used to identify the document. As described later, the document ID is embedded in an embedding process in which information is embedded by changing tones of an image with predetermined patterns. The watermark printing is a technique that enables visual determination in copying to suppress forgery of a business form, a receipt, or the like. Specifically, the watermark printing is a technique that causes a latent image region and a background region, which appear to have the same density in the printing, to be copied in different densities in the copying to clarify that a product obtained in the copying is a copied product. The latent image region is a region printed also in the copying, while the background region is a region that is not printed in the copying.

In the case where the watermark printing and the embedding process are applied to the same region on a print sheet, the embedded information is printed in the background region in the copying of the print original, and there is a possibility that the density difference between the latent image region and the background region of the watermark printing becomes small. Thus, there is a possibility of a decrease in visual readability. In the present embodiment, description is given of a process of reducing the decrease in visual readability also in the case where both of the watermark printing and the embedding process are performed.

In S3001, the MFP 10 obtains the document data (original image). Specifically, in the present embodiment, the host PC 50 connects to a not-illustrated external PC via the network I/F 507 to make a request for the document data, and obtains the document data from the external PC. The host PC 50 transmits a command to print the obtained document data to the MFP 10. In S3001, the MFP 10 obtains the document data sent from the host PC 50 as described above.

In the present example, the document data is assumed to be described in a PDL. The PDL is an abbreviation of page description language, and is formed of a set of rendering commands in a page unit. Types of rendering commands are defined for each PDL specification, and the following three types are mainly used as examples in the present embodiment Command 1) Text rendering command (X1, Y1, X2, Y2, color, font information, character string information)

Command 2) Box rendering command (X1, Y1, X2, Y2, color, paint pattern)

Command 3) Image rendering command (X1, Y1, X2, Y2, image file information)

Other appropriate rendering commands such as a dot rendering command for rendering a dot, a line rendering command for rendering a line, and a circle rendering command for rendering an arc are used depending on application.

PDLs that are generally commonly used include portable document format (PDF) proposed by Adobe Inc., XPS proposed by Microsoft Corporation, IP-GL/2 proposed by Hewlett-Packard Company, and the like. Any PDL may be used as the PDL in the present embodiment, and a PDL other than those described above may be applied.

Figure 4:
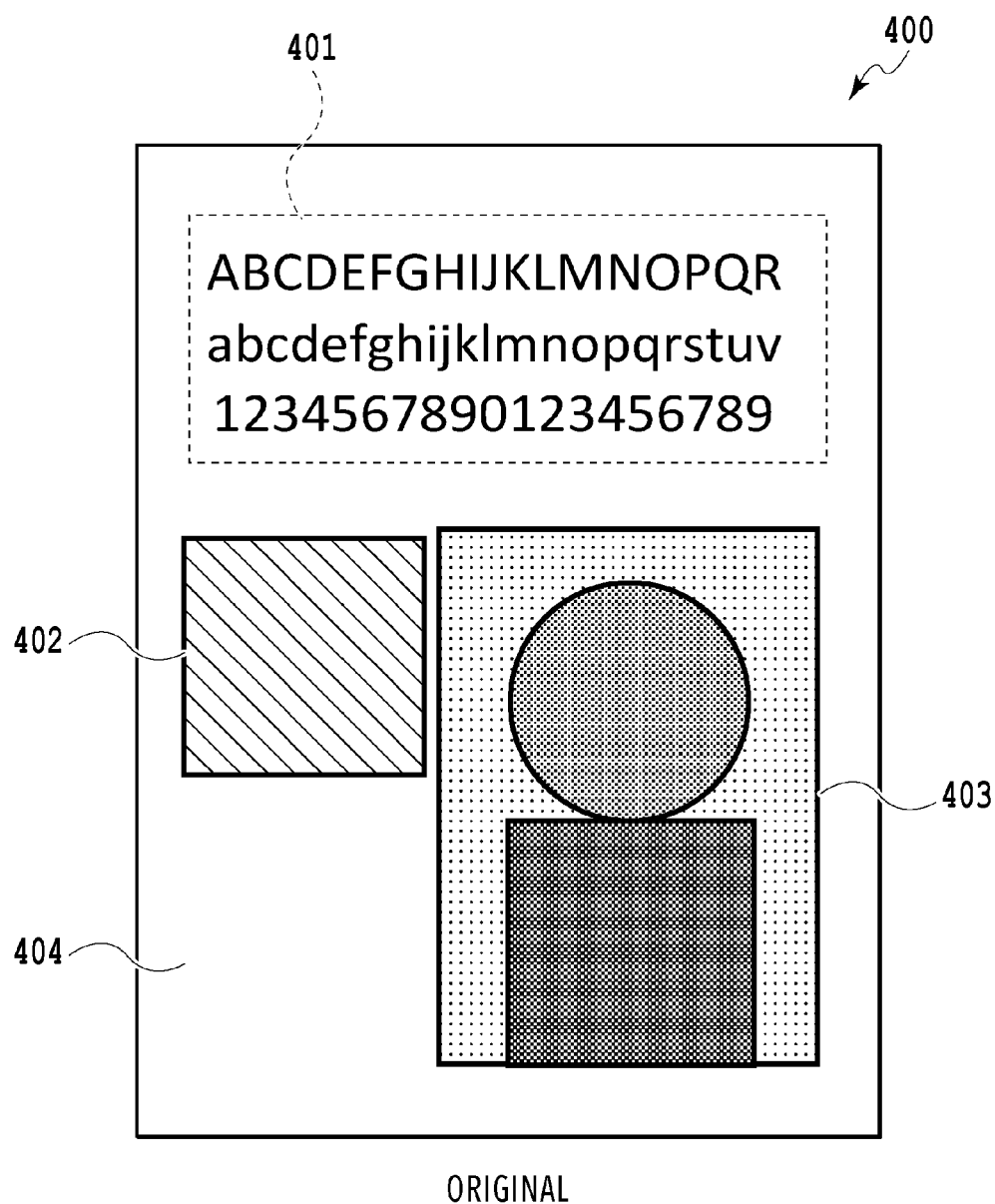
FIG. 4 is a diagram illustrating an example of an original corresponding to document data.

FIG. 4 is a diagram illustrating an example of an original corresponding to the document data. An original 400 in FIG. 4 expresses one page of the document data and has a horizontal width of 600 pixels and a vertical width of 900 pixels in terms of the number of pixels. Moreover, an example of the PDL corresponding to the document data expressing the original 400 of FIG. 4 is described below.

```
<PAGE=001>
    <TEXT> 50,50, 200, 100, BLACK, STD-18,
        "ABCDEFGHIJKLMNOPQR" </TEXT>
    <TEXT> 50,100, 200, 150, BLACK, STD-18,
        "abcdefghijklmnopqrstuv" </TEXT>
    <TEXT> 50,150, 200, 200, BLACK, STD-18,
        "1234567890123456789" </TEXT>
    <BOX> 50, 300, 200, 450, GRAY, STRIPE </BOX>
    <IMAGE> 250, 300, 550, 800, "PORTRAIT.jpg" </IMAGE>
</PAGE>
```

<PAGE=001> in the first row is a tag expressing the page number in the present embodiment. Since the PDL data is normally designed to enable description of multiple pages, a tag indicating page partition is written in the PDL data. In the present example, the PDL expresses that the first page is up to </PAGE> in the ninth row. In the present example, the first page corresponds to the original 400 of FIG. 4. In the case where there is a second page, <PAGE=002> is written subsequent to the above PDL.

A portion from <TEXT> in the second row to </TEXT> in the third row is a rendering command 1, and corresponds to a character string of the first row in an object 401 of FIG. 4. The first two coordinates indicate coordinates (X1, Y1) that are an upper left corner of a rendering region, and the subsequent two coordinates indicate coordinates (X2, Y2) that are a lower right corner of the rendering region. Next, the rendering command 1 describes that the color is BLACK (black color: R=0, G=0, B=0), and the font of the characters is "STD" (standard). Moreover, the rendering command 1 describes that the character size is 18 points and the character string to be written is "ABCDEFGHIJKLMNOPQR".

A portion from <TEXT> in the fifth row to </TEXT> in the sixth row is a rendering command 2, and corresponds to a character string of the second row in the object 401 of FIG. 4. The first four coordinates and the two character strings express the rendering region, the character color, and the font of the characters as in the rendering command 1. Moreover, the rendering command 2 describes that the character string to be written is "abcdefghijklmnopqrstuv".

A portion from <TEXT> in the seventh row to </TEXT> in the eighth row is a rendering command 3, and corresponds to a character string of the third row in the object 401 of FIG. 4. The first four coordinates and the two character strings express the rendering region, the character color, and the font of the characters as in the rendering commands 1 and 2. Moreover, the rendering command 3 describes that the character string to be written is "1234567890123456789".

A portion from <BOX> to </BOX> in the ninth row is a rendering command 4, and corresponds to an object 402 in FIG. 4. The first two coordinates indicate upper left coordinates (X1, Y1) that are a rendering start point, and the subsequent two coordinates indicate lower right coordinates (X2, Y2) that are a rendering end point. Next, the color is specified to be GRAY (gray color: R=128, G=128, B=128), and the paint pattern is specified to be STRIPE (stripe pattern) that is a stripe pattern. In the present embodiment, regarding the direction of the stripe pattern, the stripe pattern is always lines extending in a direction toward the lower right side. However, the configuration may be such that the angle, frequency, and the like of the lines can be specified in the box rendering command.

Next, an image rendering command in the tenth row corresponds to an object 403 in FIG. 4. The image rendering command describes that a file name of an image present in this region is "PORTRAIT.jpg". This expresses that the image is a file of JPEG that is a widely-used image compression format.

Then, </PAGE> written in the eleventh row describes that the rendering for this page is completed.

Note that, in many cases, an actual PDL file is a file integrally including the "STD" font data and the "PORTRAIT.jpg" image file in addition to the rendering command set described above. This is because, in the case where the font data and the image file are separately managed, the character portion and the image portion cannot be formed only with the rendering commands, and information is insufficient for forming the image of the original 400 in FIG. 4. That is the description of the document data obtained in S3001 of FIG. 3A.

In S3002, the MFP 10 obtains the document ID that indicates the authenticity of the document data obtained in S3001. For example, the document ID maybe information calculated based on the entire document file including the PDL file, the font data, and the image file described above. In the present embodiment, the document ID is 256-bit information. A calculation method of this document ID is designed such that, in the case where any of the files forming the document is changed, the calculated document ID takes a different value. Accordingly, a unique document ID corresponds to the document file. Specifically, in the present embodiment, the document ID is obtained in such a way that the MFP 10 makes the request of the document ID to the external PC from which the host PC 50 has obtained the document file, and receives the document ID. Note that the MFP 10 may obtain the document ID from the host PC 50. Moreover, the MFP 10 may obtain the document ID together with the document data.

As another implementation method, there may be adopted a configuration such as a block chain in which the document data and the document ID are managed in multiple external PCs and the host PC 50 makes the request of the document ID to these multiple PCs. Then, the MFP 10 may obtain the document data and the document ID obtained by the host PC 50 as described above. Using a system such as the block chain can reduce a manipulation risk of the document ID itself.

Subsequently, in S3003, the MFP 10 performs a rendering process of the document data obtained in S3001. The rendering process is a process of executing the rendering commands described in the PDL data and forming a bitmap image formed of color information of each pixel. In the present embodiment, since the original 400 of FIG. 4 has the horizontal width of 600 pixels and the vertical width of 900 pixels as described above, the bitmap image generated in this step is an image formed of 600×900 pixels. Moreover, in each pixel, each of R/G/B are assumed to be expressed in 256 levels of 8 bits.

In S3004, the MFP 10 obtains watermark region information. The watermark region information is information indicating which region in the original is the latent image region and which region is the background region in the case where the watermark printing is performed.

Figure 5:
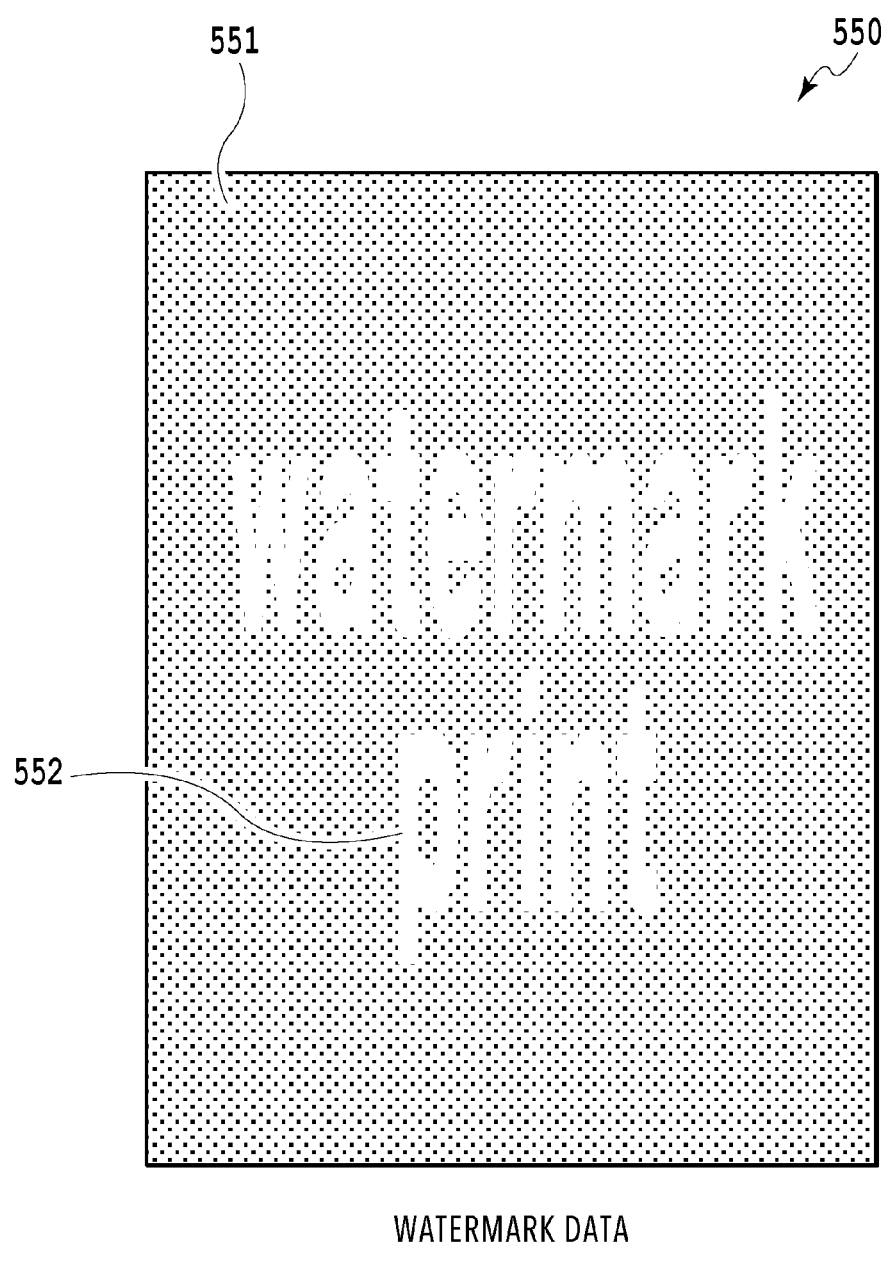
FIG. 5 is a diagram illustrating an example of watermark region information.

FIG. 5 is a diagram illustrating an example of the watermark region information. A region 550 in FIG. 5 expresses the entire original region. A region size of the region 550 is the same as the size of the original 400 in FIG. 4, and pixels in FIG. 5 correspond to the respective pixels in FIG. 4 in a one-to-one manner. In the printing, the image of FIG. 5 and the image of FIG. 4 are printed by being laid one on top of the other. No watermark region information of FIG. 5 may be printed in the portions of FIG. 4 where there are images, or the watermark region information of FIG. 5 may be printed also in the portions of FIG. 4 where there are images. Each of the pixels in FIG. 5 has a value of 0 or 1 that are two types of values, and it is assumed that 0 expresses the background region and 1 expresses the latent image region. In FIG. 5, a hatched region expresses a latent image region 551, and a white background region expresses a background region 552. Specifically, a region in which "watermark printing" is written in white is the background region 552. In the background region 552, in the case where the scanning and the copying is performed, the density decreases and an output becomes close to paper white. Meanwhile, in the latent image region 551, a density decrease in the case where the scanning and the copying is performed is smaller than that in the background region, and an output has a higher density than the background region. For example, in the case where characters such as "no copying" are printed by the watermark printing, the characters of no copying become visible in the copying, and the original document and the copied document can be distinguished from each other.

Specifically, in the watermark printing, the latent image region has many pixels printed in a form in which multiple print pixels are consecutively arranged. Meanwhile, in the background region, there are many pixels printed in a form in which printed pixels are not consecutively arranged and are printed as isolated pixels. Specifically, the number of pixels printed adjacent to the printed pixels in the background region is smaller than the number of pixels printed adjacent to the printed pixels in the latent image region. Moreover, the latent image region 551 and the background region 552 are designed to be printed and outputted at substantially the same density in the printing. This design provides the following effect: in the case where the copying and the scanning are performed, a portion of the background region formed of the isolated pixels is read to have a very low density, and a portion of the latent image region in which multiple pixels are consecutively printed is read to have a sufficiently high density. As a result, in the case where the print original in which the watermark is formed is read, the following relationship is implemented.

Density of Latent Image Region> Density of Background Region

Description of the processes of FIG. 3 continues. In S3005, the MFP 10 performs a multiplexing process of the watermark and the document ID. Specifically, the MFP 10 generates a multiplexed image in which the watermark print process and the embedding process of the document ID are combined. Note that multiplexing is also referred to as performing embedding. Specifically, the multiplexed image is generated by superimposing the document ID obtained in S3002 on the bitmap image generated by the rendering in S3003. The reason for performing the multiplexing process is to allow extraction of the document ID from the scanned print original on the copier side in the case where an outputted product (print original) obtained by printing the multiplexed image is copied with the copier. Using such a multiplexed image allows, for example, determination of whether the print original itself is an original based on a digital document managed by the document ID or not. In the present embodiment, the embedding of the document ID is performed together with the watermark printing. In S3005, the MFP 10 performs a multiplexing process on the rendered image generated in S3003 by using the document ID obtained in S3002 and the watermark region information obtained in S3004. This process is performed to allow extraction of the document ID from the scanned original on the copier side while allowing the watermark printing to preferably exhibit its effects in the case where an outputted product obtained by printing the multiplexed image is copied with the copier. Specifically, this process is performed to allow determination of whether the outputted product itself is based on a digital document managed by the document ID or not on the copier side while allowing visual determination of whether the outputted product is a copied product or not.

In the present embodiment, the document ID is embedded in the latent image region. Although the example in which the background region 552 in FIG. 5 is a character portion is described in the description of FIG. 5, the background region is not limited to this. Generally, in the watermark printing, the background region is set as the character portion or, oppositely, the latent image region is set as the character portion, and the watermark printing may be carried out in either mode. The background region is set as the character region in the present embodiment because, in view of proportions of areas occupied by the background region and the latent image region with respect to the entire page, the occupation area of the latent image region is larger. Specifically, in the case where information is embedded in the embedding process, the larger the occupation area is, the larger the region in which the information can be embedded. Accordingly, an amount of data that can be embedded can be increased. Note that the character portion may be set to the latent image region in the case where the area of the character portion is made sufficiently large by, for example, setting a large font size for the characters. Specifically, it is only necessary to set one of the character portion and the non-character portion that has the larger occupation area to the latent image region.

Figure 6:
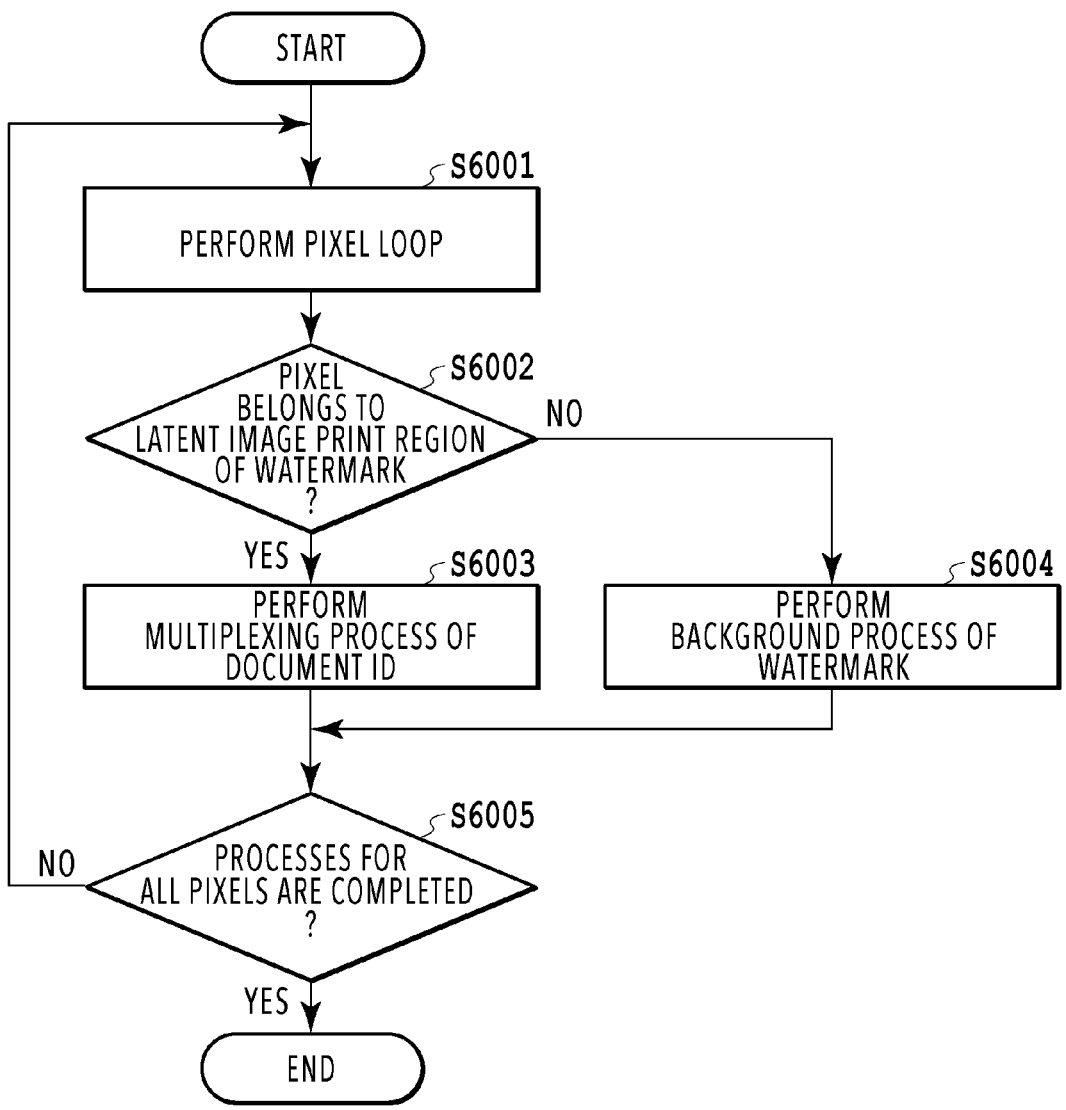
FIG. 6 is a flowchart illustrating details of a multiplexing process of a watermark and a document ID.

FIG. 6 is a flowchart illustrating details of the multiplexing process of the watermark and the document ID in S3005. In S6001, the MFP 10 starts a pixel loop process repeated for each of pixels from the upper left pixel to the lower right pixel in the image rendered in S3003. Note that the processing order of the pixels is not limited to that described above, and it is only necessary to process unprocessed pixels one by one. A pixel that is to be processed in the loop process is referred to as pixel of interest hereinafter.

In S6002, the MFP 10 checks the watermark region information corresponding to the pixel of interest and obtained in S3004, and determines whether the pixel of interest is a pixel belonging to the latent image region of the watermark. In the case where the determination result is yes, the MFP 10 proceeds to S6003. In the case where the determination result is no, the pixel of interest is a pixel belonging to the background region, and thus the MFP 10 proceeds to S6004.

In S6003, the MFP 10 performs the embedding process of the document ID for the pixel of interest. FIGS. 7A to 7C are diagrams illustrating masks used in the multiplexing process of the watermark and the document ID. Details of the embedding process are described later and, in S6003, a pattern of FIG. 7A or 7B is embedded depending on whether data to be embedded is "0" or "1". S6003 is a process of embedding the pattern of the document ID in a region to be set as the latent image region. After the completion of the embedding, the MFP 10 proceeds to S6005.

In S6004, the MFP 10 performs background embedding of the watermark. In this case, the embedding is performed in the pattern of FIG. 7C, independent of the embedded data of the document ID. After the completion of the embedding, the MFP 10 proceeds to S6005.

In S6005, the MFP 10 determines whether the processes for all pixels are completed. In the present example, the pixel of interest first starts from the upper left pixel, moves to a pixel that is one pixel to the right every time one pixel is processed, and, in the case where the process for a pixel at the right end is completed, moves to a pixel that is one pixel below and that is at the left end. Accordingly, the processes for all pixels are completed in the case where the process for a pixel at the right end and the lower end is completed. In the case where the determination result is yes, the MFP 10 terminates the process, and proceeds to S3006 of FIG. 3A. In the case where the determination result is no, the MFP 10 proceeds to S6001, and continues the process by setting the next unprocessed pixel as the pixel of interest.

Details of the information embedding process of FIGS. 7A to 7C performed in S6003 and S6004 are described.

In the present embodiment, the embedded information is handled as binary data, and is superimposed on the bitmap image. The binary data is described below. Handling information in the information processing apparatus typified by the PC specifically means handling binary data. The binary data is information of "0" or "1", and consecutive connection of pieces of information of "0" and "1" causes the binary data to have a specific meaning. For example, in the case where information of "hello" is handled in binary data, in the case of "shift JIS" that is one of character codes, "h" corresponds to binary data "01101000". Similarly, "e" corresponds to binary data of "01100101", "l" corresponds to binary data of "01101100", and "o" corresponds to binary data of "01101111". Specifically, the characters "hello" can be expressed as "0110100001100101011011000110110001101111" in binary data. Conversely, in the case where the binary data of "0110100001100101011011000110110001101111" is obtained, the characters "hello" can be obtained. It can be understood based on this idea that the multiplexing can be implemented by embedding data in such a way that "0" and "1" are determinable.

The two masks illustrated in FIGS. 7A and 7B for generating "0" and "1" are discussed. FIGS. 7A and 7B each illustrate one mask. Each of the masks illustrated in FIGS. 7A and 7B is a mask formed of 8 px (pixels)×8 px, and can provide a periodic pattern to a region of 8 px×8 px in an image by adding the contents of the mask to the image. A digital image is basically expressed in 8 bits for one color, and one of values of 0 to 255 is assigned. Since a value outside this range cannot be used as the image data, in the case where a calculation result of a pixel value is lower than 0 or is a value equal to or higher than 256, 0 or 255 is generally assigned to make the value fit into the effective range. In the masks of FIGS. 7A to 7C, a change of −64 or 0 is provided to each pixel value. However, in the case where the values of image data in the mask region are all 0, the values in this region are all set to 0 instead of being set to −64 and 0. Note that, although description based on the example of 8 bits for one color is given in the explanation herein, the number of bits may be other than 8 as a matter of course. Also in such a case, in handling of a digital image, there is an effective range no matter how many bits the digital image is expressed in. Accordingly, the cases other than 8-bits are the same in the point that a change outside this effective range cannot be provided.

Figure 8A:
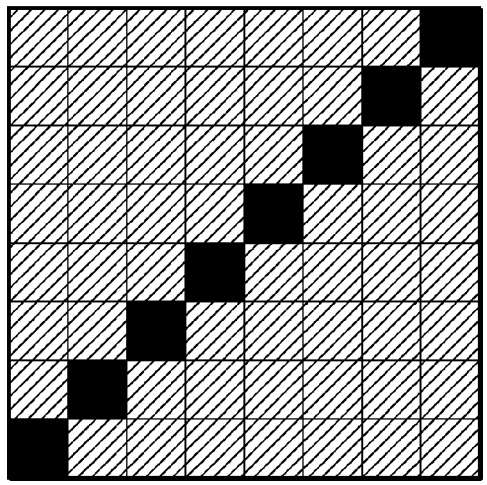
FIGS. 8A to 8C are diagrams illustrating examples in which patterns provided by the masks are visually illustrated.
Figure 8B:
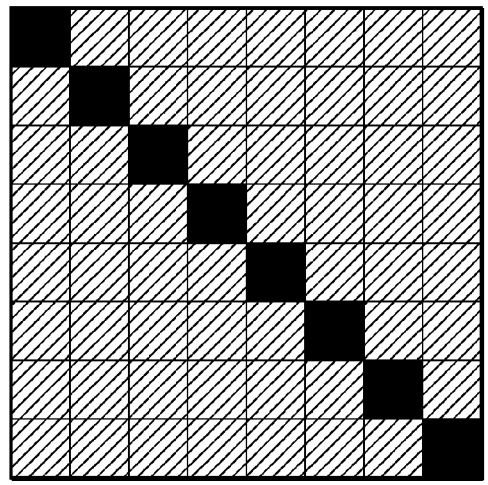
Figure 8C:
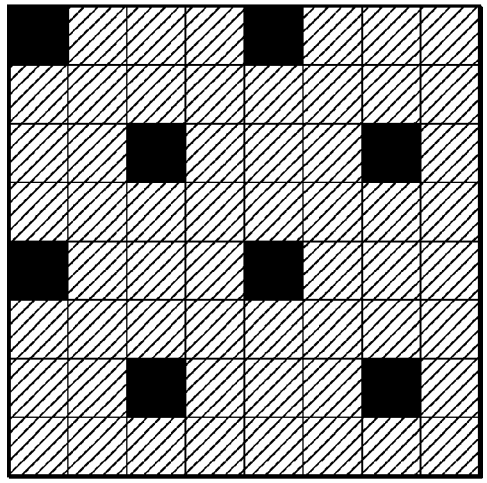

FIGS. 8A to 8C are diagrams illustrating examples in which patterns provided by the masks are visually illustrated. FIG. 8A corresponds to the mask of FIG. 7A, and FIG. 8B corresponds to the mask of FIG. 7B. Note that, although description is given later, FIG. 8C corresponds to the mask of FIG. 7C. In FIGS. 8A to 8C, positions of "−64" in the masks of FIGS. 7A to 7C are expressed by black pixels, and positions of "0" are expressed by oblique-line pixels. In the case where the masks of FIGS. 7A and 7B are applied, oblique lines formed of the black pixels in FIGS. 8A and 8B appear in the image. In the embodiment, the black pixels in FIGS. 8A to 8C express the pixels printed with the inks, and the pixels hatched with the oblique lines express pixels left as paper white without the printing of the inks. In the case where the masks of FIGS. 7A to 7C are applied only to the B pixel values of RGB, the black pixels in FIGS. 8A to 8C are yellow pixels printed with the Y ink. Meanwhile, in the case where the masks of FIGS. 7A to 7C are applied to the pixel values of all of R, G, and B in RGB, the black pixels in FIGS. 8A to 8C are gray pixels printed with the C ink, the M ink, and the Y ink or with the K ink.

A pseudo-code that alternately applies the mask of FIG. 7A and the mask of FIG. 7B to the entire image (entire image rendered in S3003) is described below.

```
01:     int i, j, k, l;
02:     int width = 600, height=900;
03:     unsigned char *data = image data;
04:     int **maskA = mask data;
05:     bool isMaskA = true;
06:     for(j = 0; j < height; j+=8){
07:       for(i = 0; i < width; i+=8){
08:         for(k = 0; k < 8; k++){
09:           for(l = 0; l < 8; l++){
10:             if(isMaskA == true){
11:               data[(i+k)+(j+l)*width] += maskA[k][l];
12:             }
13:           }
14:         }
15:       }
16:     }
```

As described above, embedding of information by the embedding process can be implemented by the aforementioned method.

Similarly, adding the contents of the mask of FIG. 7C to an image of the background region can provide a discreate pattern to a region of 8 px×8 px in the image of the background region. FIG. 8C is a diagram visually illustrating a type of a pattern provided to the image by the mask of FIG. 7C. In FIG. 8C, the positions of "−64" in the mask of FIG. 7C are expressed by black pixels, and the positions of "0" are expressed by oblique-line pixels. Discreate dot arrangement as illustrated in FIG. 8C appears in the image of the background region.

Features of each of FIGS. 7A, 7B, and 7C are described from the perspective of the watermark printing thereof. Each of the three patterns of FIGS. 7A, 7B, and 7C is formed of 8 px×8 px including eight "−64" pixels and 56 "0" pixels. Accordingly, in the case where the aforementioned three patterns are embedded in a paper white region, the three patterns are printed on a paper surface at substantially the same density in the printing. The patterns are printed not to overlap one another on the paper surface. Since the densities of the patterns in the printing are substantially the same, in the case where the print original being the original copy is printed, the patterns are outputted in a mode in which the user is less likely to distinguish the patterns from one another.

In this case, each of the dots is spaced away from the other dots in the print pattern of FIG. 8C unlike in the patterns of FIGS. 8A and 8B. Accordingly, the print pattern of FIG. 8C is read to have a low density due to image blur in the reading with the scanner. Specifically, in the copying, the print pattern of FIG. 8C resultantly becomes a region not printed as the background region. Meanwhile, since each of the dots has at least two adjacent dots in FIGS. 8A and 8B, the density decrease in the reading with the scanner is smaller than that in FIG. 8C. Specifically, in the copying, the patterns of FIGS. 8A and 8B resultantly become regions printed as the latent image region.

In this case, a difference between the density decrease in the reading of FIG. 8C and the density decrease in the reading of each of FIGS. 8A and 8B is the same as that in general watermark printing. However, a notable point of the present embodiment is a point that the degree of the density decrease in the scanner reading of FIG. 8A is substantially the same as that of FIG. 8B. Specifically, the following effects can be implemented by forming the latent image region in the watermark printing with FIG. 8A or FIG. 8B.

Not embedding the information to be embedded in the background region of the watermark printing enables printing in a form in which embedding does not hinder the density decrease of the background region in the scanning.

The latent image region of the watermark printing can be configured to have a substantially uniform density.

The information to be embedded can be embedded in the latent image region.

The information embedded as the latent image region can be maintained also in the scanning.

Although the number of pixels that have the tone change value of "−64" in FIG. 7C is set to the same number of pixels as those in FIGS. 7A and 7B in the present embodiment, the numbers of pixels do not have to be the same. It is only necessary that the densities of the respective patterns printed on the paper surface are close to one another. Accordingly, the number of pixels that have the tone change value of "−64", the tone change value, and the like can be increased or decreased according to print characteristics of the printing apparatus. Oppositely, the pattern shapes and the density values of FIGS. 7A and 7B may be changed to bring the densities of the respective patterns close to one another.

In the present embodiment, the aforementioned embedding is performed only on the B pixel values among the RGB pixel values in FIG. 4. This is because, in the case where the printing is performed on a paper white portion with the inks, the visibility of the Y ink is lower than those of the other inks such as the C ink, the M ink, and the K ink. The embedded information is preferably as less visible as possible so as not to affect the original document information. Accordingly, control is performed such that the tone change is performed for the B pixel values to make the change of the Y ink greatest.

In S3006, the MFP 10 performs a generation process of generating a print image. Any publicly-known method can be used as the generation process of the print image. In the present embodiment, the print image is generated by the following method. In the present embodiment, the following four processes are performed on each of pixels in the bitmap image (multiplexed image) that is generated in the multiplexing process in S3005 and that is formed of RGB pixel values subjected to the multiplexing of the document ID and the watermark.

Color conversion
Ink color separation
Output characteristic conversion
Quantization In this case, the color conversion is a process of converting the RGB pixel values of the multiplexed bitmap image such that the MFP 10 can preferably print the image. The reason for this is as follows. Color values that can be preferably expressed on a display are generally set for the colors described in the rendering commands of PDL and, in the case where these values are outputted as they are in a printer, different colors are outputted.

In the color conversion, specifically, a three-dimensional look-up table is used to calculate a preferable combination of output pixels values (Rout, Gout, Bout) for a combination of input pixel values (Rin, Gin, Bin). Ideally, since each of Rin, Gin, and Bin that are the input values has 256 levels, a table Table1 [256][256][256][3] having 256×256×256, that is a total of 16,777,216 combinations of output values is prepared. Then, the color conversion can be implemented by setting the output pixel values as follows.

Rout=Table1 [Rin][Gin][Bin][0]
Gout=Table1 [Rin][Gin][Bin][1]
Bout=Table1 [Rin][Gin][Bin][2]

Moreover, it is possible to use a publicly-known technique of reducing the table size such as reducing the number of grids in the look-up table from 256 grids to, for example, 16 grids or the like and determining the output values by interpolating table values of multiple grids.

The ink color separation is a process of converting Rout, Gout, and Bout that are the output values of the color conversion process to output values of the respective ink colors used in the printing apparatus. In the present embodiment, the four ink colors of cyan, magenta, yellow, and black are assumed to be used. Although there are various methods of implementing this conversion, in the present embodiment, a preferable combination of ink color pixel values (C, M, Y, K) is calculated for the combination of the output pixel values (Rout, Gout, Bout) as in the color conversion process. In this calculation, a three-dimensional look-up table Table2 [256][256][256][4] is used. Then, the ink color separation can be implemented by setting the ink color pixel values as follows.

C=Table2[Rout][Gout][Bout][0]
M=Table2[Rout][Gout][Bout][1]
Y=Table2[Rout][Gout][Bout][2]
K=Table2[Rout][Gout][Bout][3]

Moreover, a publicly-known technique of reducing the table size may be used.

In this case, in the multiplexing process of S3005, CMYK pixel values corresponding to the pixel values (R=255, G=255, B=191) that are the result of the tone change on the paper white (R=255, G=255, B=255) using the masks of FIGS. 7A to 7C are preferably the following values. Specifically, only the Y pixel value is preferably a value larger than 0. Moreover, the other CMK pixel values are preferably values close to 0 and smaller than the Y pixel value. The reason for this is because, as described in the multiplexing process in S3005, the visibility of the embedded image is desired to be made low.

The output characteristic conversion is a process of converting the density of each ink color to a print dot count ratio. Specifically, for example, 256-level densities of the respective colors are converted to 1024-level dot count ratios Cout, Mout, Yout, and Kout of the respective colors. To implement this, a one-dimensional look-up table Table3 [4][256] in which preferable print dot count ratios are set for the densities of the respective ink colors is used. Then, the output characteristic conversion can be implemented by setting the dot count ratios as follows.

Cout=Table3[0][C]
Mout=Table3[1][M]
Yout=Table3[2][Y]
Kout=Table3[3][K]

Moreover, it is possible to use a publicly-known technique of reducing the table size such as reducing the number of grids in the look-up table from 256 grids to, for example, 16 grids or the like and determining the output values by interpolating table values of multiple grids.

The quantization is conversion of each of the print dot count ratios Cout, Mout, Yout, and Kout of the respective ink colors to a value indicating on or off of a print dot in each actual pixel. Any method such as an error diffusion method or a dither method may be used as the method of quantization. As an example, in the dither method, on or off of the print dots of the respective ink colors can be implemented by setting the values as follows:

Cdot=Halftone[Cout][x][y]
Mdot=Halftone[Mout][x][y]
Ydot=Halftone[Yout][x][y]
Kdot=Halftone[Kout][x][y]

and comparing the values with thresholds corresponding to each pixel position. Occurrence probabilities of the respective print dots are Cout/1023, Mout/1023, Yout/1023, and Kout/1023. The generation process of the print image in S3006 is thereby completed.

Next, in S3007, the MFP 10 performs printing using the print image generated in S3006. Performing the series of processes as described above allows the print original, created by embedding the background region and the latent image region in which the document ID is multiplexed in the document data, to be printed on the print sheet and obtained. With reference to FIGS. 8A and 8B, it can be found that the pattern of the latent image region is drawn with oblique lines of 1 px (pixel). A process of generating a printed product created by embedding the document ID in an image based on a rendered image as described above is also referred to as "multiplex encoding process".

Although the example in which the tone change is performed on the B pixel values in the RGB pixel values is described in the present embodiment, a method in which the tone change is performed on the CMYK pixel values may be used. In this case, the paper white is Y=0, M=0, C=0, and K=0, and the tone change with respect to the paper white needs to take a positive value. Accordingly, it is only necessary to invert the signs of the tone change values illustrated in FIGS. 7A to 7C. Specifically, it is only necessary to invert the tone change value of −64 to +64 and invert the tone change value of +64 to −64.

The method in which the tone change is performed on the CMYK pixel values provides higher controllability in the case where the ink to be applied to the paper white is limited only to the Y ink. Meanwhile, the method in which the tone change is performed on the RGB pixel values provides higher controllability of suppressing changes in color hues in the case where information is embedded in the image portion. Accordingly, it is preferable to select a preferable tone change method depending on the characteristics of print processes such as electrophotographic or inkjet, ratios of paper white, character, and image regions in the document, and the like.

Moreover, although the tone change value is 64 in the present embodiment, the tone change value is not limited to this. In order to clearly control the dot shape or to align the print patterns between the inkjet printing methods or the electrophotographic print methods, it is effective to increase the tone change value. For example, setting the tone change value around 255 is effective. Moreover, in the case where the print density on a paper surface is desired to be reduced, the pattern size that is 8×8 pixels in the present embodiment may be increased. Alternatively, the tone change values of FIGS. 7A to 7C may be arranged in, for example, patterns forming broken lines instead of the solid lines. For example, a pattern of "repetition of three pixels with a pixel value of −255 and one pixel with a pixel value of −0" may be used. A pattern of "repetition of two pixels with a pixel value of −255 and two pixels with a pixel value of −0" may be also used. For example, a pattern in which "one pixel in every four pixels is set to 0" may be used. Moreover, a pattern in which "half of the pixels are set to 0 in a checkerboard pattern" may be used. Any two or more of the patterns may be combined. It is preferable that the tone change values in FIG. 7C are also similarly appropriately set according to the settings of the tone change values in FIGS. 7A and 7B.

<Information Extracting Process>

Next, the information extracting process of extracting the information embedded as described above from the print original is described. As described above, FIG. 3B is the flowchart illustrating an example of the information extracting process. Although the MFP 10 is described to perform the information extracting process in the following example, for example, the host PC 50 may perform processes of obtaining a bitmap image in S3102 and beyond or processes of extracting the document ID information in S3103 and beyond.

In S3101, the MFP 10 reads a printed product (print original) in which the document ID is multiplex-encoded. First, the user sets the print original in the scanner unit 12, and inputs a read instruction. Then, in S3101, the MFP 10 performs a process of reading the original. Specifically, the MFP 10 controls the scanner unit 12 such that the original is irradiated with LED light and imaging elements such as CCDs corresponding to the respective pixels convert reflected light to analog electric signals.

Next, in S3102, the MFP 10 digitalizes the analog electric signals obtained in the process of S3101, and obtains a bitmap image formed of digital RGB pixel values. Any publicly-known method can be used in the process of obtaining the bitmap image. In the present embodiment, an example using the following method is described. In the present embodiment, the following four processes are performed on each of the pixels in the bitmap image obtained in S3102 and formed of the RGB pixel values.

MTF correction
Input correction
Shading correction
Color conversion

The modulation transfer function (MTF) correction is a process of performing correction relating to resolution among reading performances of the scanner. In the reading with the scanner unit 12, an image is defocused due to deviation from a focus position, limitations in performance of a lens itself, or the like. Accordingly, restoration is performed to some extent by performing a filter process using the MTF correction or the like. In actual, in the case where an enhancing process is performed at such a strength that the image is completely restored, a white area is formed or an image noise and a dust pixel are enhanced, and image defects stand out more than the enhancement. Accordingly, the design is performed while achieving a balance between the image improvement and the image defect. Description is given below of an example in which an edge enhancement filter that multiples pixel values in an image center portion fivefold and that multiples pixel values in upper, lower, left, and right portions by −1 is used in the MTF correction to simplify the description.

R'[x][y]=R[x][y]×5-R[x−1][y]-R[x+1][y]-R[x][y−1]-R[x][y+1]
G'[x][y]=G[x][y]×5-G[x−1][y]-G[x+1][y]-G[x][y−1]-G[x][y+1]
B'[x][y]=B[x][y]×5-B[x−1][y]-B[x+1][y]-B[x][y−1]-B[x][y+1]

The input correction is a process of converting an output value of the CCD that is originally a photon amount, to lightness matching the sensitivity of the human eyes. Specifically, for example, R"G"B" signals with 4096 levels for each color are converted to color intensity values R", G", and B" with 1024 levels for each color. This can be implemented by performing processes as described below while using a one-dimensional look-up table Table4 [4][4096] in which preferable print dot count ratios are set for the densities of the respective ink colors.

R"=Table4[0][R']
G"=Table4[1][G']
B"=Table4[2][B']

Moreover, it is possible to use a publicly-known technique of reducing the table size such as reducing the number of grids in the look-up table from 4096 grids to, for example, 256 grids or the like and determining the output values by interpolating table values of multiple grids.

The shading correction is a process of reducing color unevenness or density unevenness caused by variation in reading sensitivities at the respective pixel positions caused by manufacturing variation or assembly variation in the lens, the LED, and the CCDs forming the scanner unit 12. Specifically, for example, the R"G"B" signals with 1024 levels for each color are converted to color intensity values R''', G''', and B''' with 256 levels for each color. This can be implemented by performing processes as described below on each signal in a direction (X direction) in which scanner lenses are arranged, while using a one-dimensional look-up table Table5 [x][3][1024] for density conversion for each X pixel position.

R'''=Table5[x][0][R" ]
G'''=Table5[x][1][G" ]
B'''=Table5[x][2][B" ]

Moreover, it is possible to use a publicly-known technique of reducing the table size such as reducing the number of grids in the look-up table from 1024 grids to, for example, 256 grids or the like and determining the output values by interpolating table values of multiple grids.

Next, the color conversion process is performed. The color conversion process is a process in which, since R''', G''', and B''' calculated at this point are values unique to the scanner device, R''', G''', and B''' are converted to Rout, Gout, and Bout values preferable for displaying on the display, conversely to the color conversion in the printing. To implement this, since each of R''', G''', and B''' that are the input values has 256 levels, a table Table6 [256][256][256][3] having 256×256×256, that is a total of 16,777,216 combinations of output values is prepared as in the color conversion in the printing. Then, the color conversion can be implemented by performing processes as follows.

Rout=Table6[R'''][G'''][B'''][0]
Gout=Table6[R'''][G'''][B'''][1]
Bout=Table6[R'''][G'''][B'''][2]

Moreover, it is possible to use a publicly-known technique of reducing the table size such as reducing the number of grids in the look-up table from 256 grids to, for example, 16 grids or the like and determining the output values by interpolating table values of multiple grids. The process of obtaining the bitmap image in S3102 is completed by performing the processes as described above.

In S3103, the MFP 10 extracts the multiplexed document ID from the bitmap image obtained in S3102. As an extraction method, the MFP 10 determines which one of the patterns of FIGS. 7A and 7B is printed in the unit of 8×8 pixels, and takes out information of "0" or "1". Repeating this process decodes the multiplexed information.

Next, in S3104, the MFP 10 determines whether the document ID has been extracted. In the case where the determination result is yes, the MFP 10 proceeds to S3105. In the case where the determination result is no, the MFP 10 proceeds to S3108, displays information indicating that "document is non-authentic document" on an external display (not illustrated), and terminates the process.

There may be the following two possibilities in the case where the determination result is no.
Possibility 1. Case where the document ID is not embedded in the first place in the document scanned in S3101.
Possibility 2. Case where the document ID is embedded, but the embedded data cannot be read due to smears on the printed product or addition of a large amount information in handwriting after the printing.

In the case of Possibility 1, the MFP 10 only needs to directly proceed to S3108. Meanwhile, in the case of Possibility 2, the MFP 10 may notify the user of information indicating that "document ID is embedded but document is non-authentic document". This allows the user to recognize the risk of manipulation of the document or the like.

In the present embodiment, the MFP 10 can make the determination of Possibility 2 in the case where one bit or more and 255 bits or less of the 256-bit document ID are extracted in S3103. However, considering the possibility of the case where the scanned document happened to incidentally include one pattern of similar image, it is preferable that the MFP 10 makes the determination of Possibility 2 in the case where at least 128 bits, that is half or more and 255 bits or less of 256-bit document ID are extracted.

In S3105, the MFP 10 checks the extracted document ID. For example, the MFP 10 may request the host PC 50 to perform the checking. Then, the host PC 50 requests an external PC via the network I/F 507 to check whether the extracted document ID is a formal ID. As described in S3002, in this case, the risk of manipulation of the document ID itself can be reduced by employing the configuration of block chain in which multiple PCs manage the document data and the document ID. Note that the checking request to the external PC may be performed by the MFP 10, or the checking may be performed inside the system of the host PC 50 and the MFP 10 without the checking in the external PC.

In S3106 subsequent to S3105, the MFP 10 refers to the check result and determines whether the document ID is authentic. In the case where the determination result is yes, the MFP 10 proceeds to S3107. In the case where the determination result is no, the MFP 10 proceeds to S3109, displays information indicating that "document is non-authentic document", and terminates the process.

Also in the case where the determination result is no in S3106, the MFP 10 may notify the user of information that "document ID is embedded but document is non-authentic document". This allows the user to recognize the risk of manipulation of the document or the like. In S3107, the MFP 10 displays information indicating that "document is authentic document", and terminates the process.

Note that, in the present embodiment, the visibility as the watermark printing is secured by not embedding the embedded information (document ID) in the background region of the watermark printing. Accordingly, the embedded information corresponding to the background region of the watermark printing is sometimes lost. This matter is preferably handled by performing the following operations. Table 1 illustrates an example in which the watermark printing, the embedding process, and the extracting process are preferably performed on a blank region of the original.

TABLE 1

Processing example in which effect of background region of watermark printing is reduced

| | Embedding Process | Extracting Process |
|---|---|---|
| Example 1 | Perform embedding while avoiding background region | Perform extraction while avoiding background region |
| Example 2 | Embed same information multiple times in latent image region | Perform complementation by using multiple extraction results |
| Example 3 | Secure latent image region with necessary size | Perform extraction from secured region |

Each of Examples 1 to 3 in Table 1 is described below in detail. Each of Examples 1 to 3 is an example of embedding the information to be embedded in the latent image region.

Example 1 is a process of embedding the information to be embedded while avoiding the background region in the embedding process. Moreover, Example 1 is a process of extracting the embedded information while avoiding the background region in the extracting process. Specifically, Example 1 is an example of suppressing loss of the embedded information due to presence of the background region of the watermark printing.

On the embedding process side of Example 1, for example, in S6001 of FIG. 6, a loop process in a processing unit of 8 px×8 px is performed instead of the loop process in the unit of one pixel. Moreover, in S6002, the MFP 10 determines whether a region of interest is the latent image region of the watermark in the processing unit of 8 px×8 px. In the case where the region of interest is the latent image region in the result of this process, the MFP 10 proceeds to S6003, and embeds the information one bit by one bit into the region of interest that is the latent image region. The embedding of the information can be thereby performed without loss. In other words, the embedding is performed while determining whether the region of interest is the latent image region, such that the information to be embedded is embedded only in the latent image region.

Meanwhile, in the extracting process of Example 1, for example, in S3103 of FIG. 3B, the MFP 10 determines whether a region of interest is blank in the unit of 8 px×8 px. In the case where the region of interest is not blank, the embedded information is extracted. In the case where the region of interest is blank, no extraction of the embedded information is performed.

Example 2 is an example of complementing the embedded information lost due to presence of the background region of the watermark printing, by embedding the same information in multiple regions. In the embedding process of Example 2, a process of embedding the same information in the latent image region multiple times is performed. Moreover, in the extracting process of Example 2, a process of complementing the information by using multiple extraction results is performed.

Figure 9:
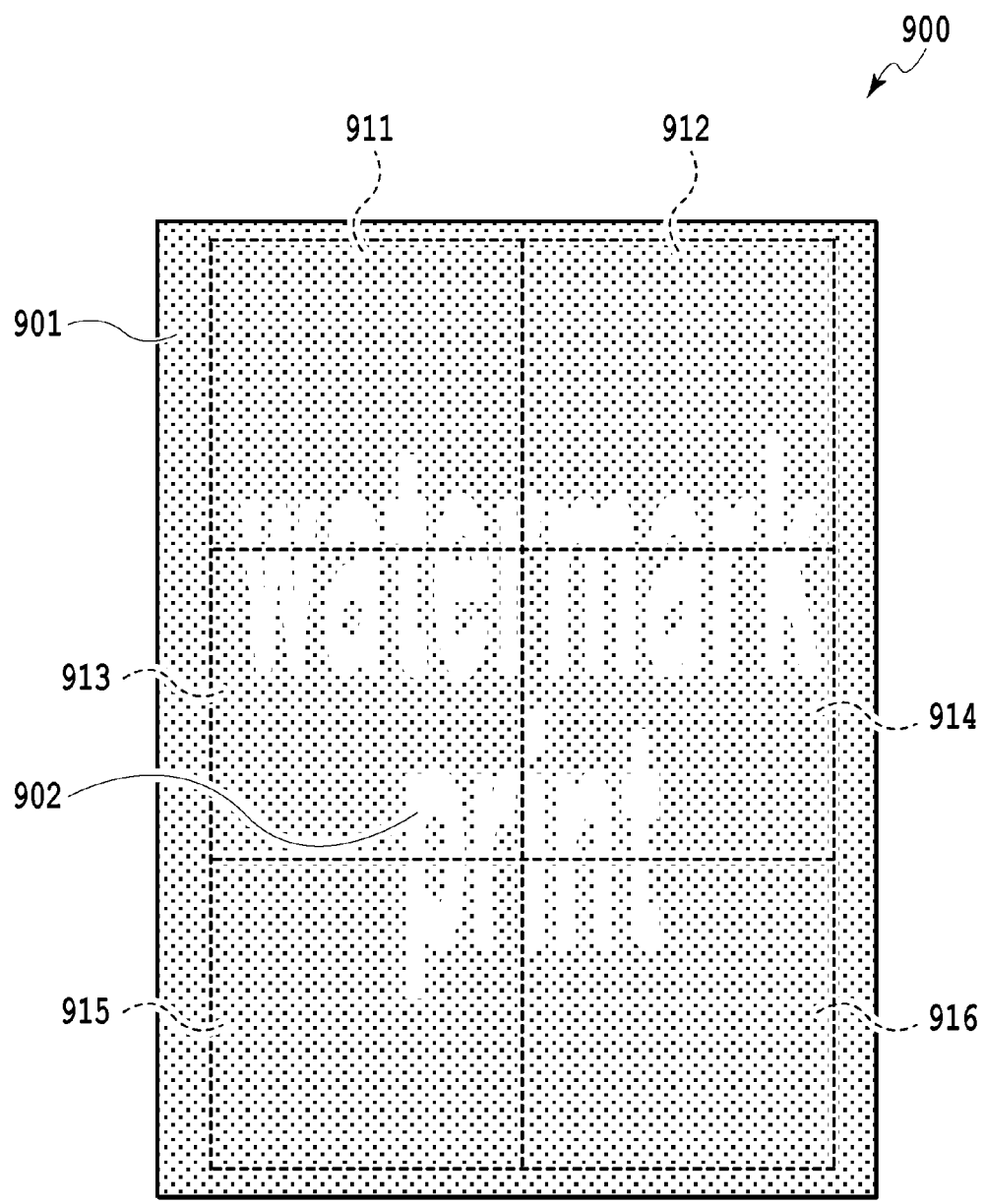
FIG. 9 is a diagram explaining positions of multiple times of embedding.

FIG. 9 is a diagram explaining positions of multiple times of embedding in Example 2. Since reference signs 900 to 902 in FIG. 9 correspond to reference signs 550 to 552 in FIG. 5, description thereof is omitted. Regions 911 to 916 sectioned by broken lines in FIG. 9 are divided regions including embedding regions, and the same embedded information is embedded in each of the regions 911 to 916. The regions 911 to 916 have the same size.

In this example, since each of the regions 911 to 916 is set to be a region of 128 px×128 px, 16×16 embedding masks illustrated in FIGS. 7A and 7B can be embedded, and 256-bit information can be embedded in each region. Specifically, on the embedding process side of Example 2, for example, in the pixel loop process of S6001 in FIG. 6, the 256-bit document ID is embedded into the latent image region in each of the regions 911 to 916 in FIG. 9. The 256-bit embedded information is embedded in, for example, an area with the size of the region 911. However, in actual, the embedded information is embedded only in the latent image region, and is not embedded in the background region. Accordingly, information that should otherwise been embedded in the background region is lost. As apparent from FIG. 9, since the background region is present in lower portions of the regions 911 and 912, the embedded information in the lower portion is lost. Similarly, the embedded information in upper and lower portions of the regions 913 and 914 is lost. Moreover, the embedded information in the upper portions of the regions 915 and 916 is lost.

Meanwhile, in the extracting process of Example 2, for example, in S3103 of FIG. 3B, the extraction of the embedded information is performed multiple times, and portions extracted in the respective extracting processes are combined to generate the 256-bit document ID. Description is given by using the example of the print original in FIG. 9. The extraction of information is possible in the latent image region (latent image portions) in the regions 911 to 916. As described above, since the portions where the information can be extracted as the latent image vary among the respective regions, the entire document ID can be extracted by combining these portions. Specifically, information extracted from upper regions of the regions 911 and 912, information extracted from central regions of the regions 913 and 914, and information extracted from lower regions of the regions 915 and 916 are combined. This allows the document ID to be restored and extracted from the embedded information in all regions.

Example 3 is an example of securing the latent image region necessary for embedding the 256-bit document ID information. In the embedding process of Example 3, a process of securing the latent image region with a necessary size is performed. In the extracting process of Example 3, a process of extracting information from the secured region is performed.

On the embedding process side of Example 3, for example, pixels enough for embedding 256-bit information is secured, as the latent image region, in the watermark region information itself obtained in S3004 of FIG. 3. Specifically, since one bit is embedded in the unit of 8 px×8 px, the 256-bit information can be embedded in the case where there is a region of 128 px×128 px. Regarding the position of the latent image region to be secured, a predetermined region may be set in advance in the watermark region information of FIG. 5, or the latent image region may be determined by detecting a non-background region (that is the latent image region) of a predetermined size. In this case, it is preferable to embed a pattern that serves as a predetermined sign (mark), and use the pattern as a sign in the extraction.

Meanwhile, in the extraction process of Example 3, the process of extracting the information from the secured latent image region is performed. Regarding information on the secured latent image region, the predetermined region may be set in advance in the watermark region information in FIG. 5, or the latent image region may be determined by detecting a portion in which the pattern serving as the predetermined sign is embedded.

Moreover, the processes of Examples 1 to 3 described above may be performed in combination. Performing the aforementioned processes can suppress loss of the embedded information due to presence of the background region of the watermark printing.

Although the example in which the MFP 10 performs the information embedding process is described in the present embodiment, the host PC 50 may perform the information embedding process. Performing the information embedding process in the host PC 50 enables creation of a print original in which pieces of information are multiplexed, by using an MFP or a printer not supporting the information embedding process.

Moreover, the configuration may be as follows: an image for multiplexing corresponding to the information embedding and the watermark printing is generated separately from the original image in the host PC 50, the image for multiplexing and the original image are both transmitted from the host PC 50 to the MFP 10, and then both images are synthesized in the MFP 10.

Also for the extraction of the embedded information, although the example in which the MFP 10 performs the information extracting process is described in the present embodiment, the host PC 50 may perform the information extracting process. Performing the information extracting process in the host PC 50 enables extraction of the information from the print original read by using an MFP not supporting the information extracting process.

As described above, according to the present embodiment, it is possible to reduce a decrease in visual readability even in the case where both of the watermark printing and the information embedding process are performed.

<Second Embodiment>>

In the first embodiment, description is given of the example in which one type of information that is the document ID is embedded in the embedding process. Assuming that the document ID is referred to as first information, in the present embodiment, description is given of a process of further embedding second information different from the first information in the print original in addition to the first information. Note that, in the case where the watermark printing and the multiple embedding processes are directly applied to the same region on the print sheet, total of three types of printing are superimposed one on top of the other. Accordingly, there is a possibility that information degradation in the reading of the information becomes great. Accordingly, in the present embodiment, description is given of an example in which extraction of the embedded information can be preferably performed even in the case where both of the watermark printing and the set of the two types of information embedding processes are performed.

In the present embodiment, description is given of an example in which the following two types of information are embedded in the print original (print document).

Document ID

Apparatus information.

The document ID is as described in the first embodiment. The apparatus information is apparatus model information such as an apparatus model name of the MFP 10 or information on a print process such as a print mode. Hereinafter, the document ID is referred to as first information and the apparatus information is referred to as second information in some cases. However, these pieces of information may be referred to such that the document ID is referred to as the second information and the apparatus information is referred to as the first information. The first information and the second information are sometimes obtained respectively from systems of different information obtaining sources. Moreover, a system of extracting the embedded first information and a system of extracting the second information may also be different. Accordingly, the first information and the second information need to be handled separately as independent pieces of information. Moreover, the first information and the second information are not limited to those in the aforementioned example, and any information may be handled as the first information and the second information.

Figure 10A:
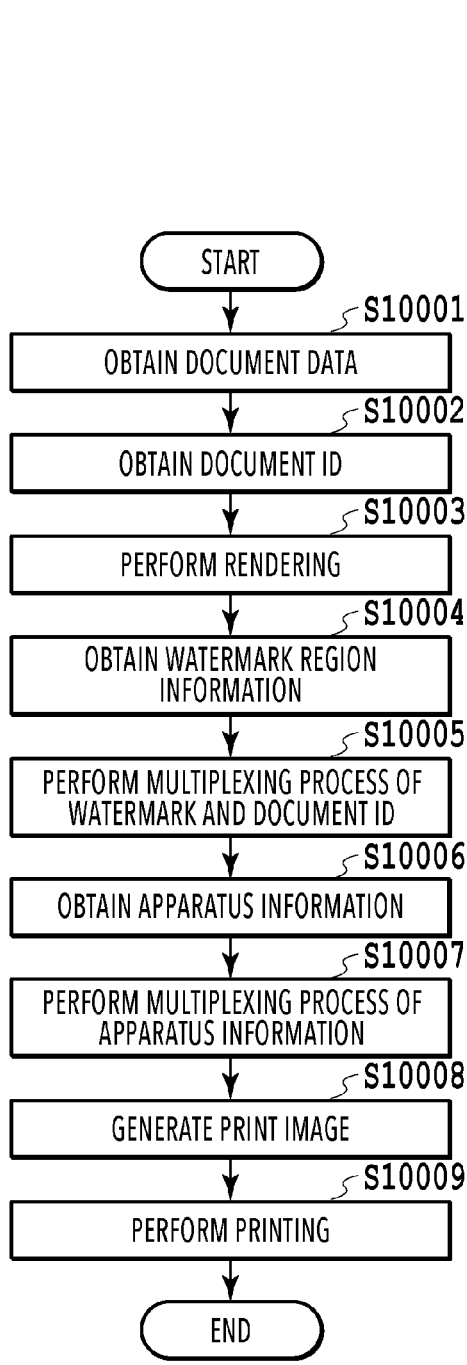
FIGS. 10A and 10B are flowcharts explaining an information embedding process and an information extracting process.
Figure 10B:
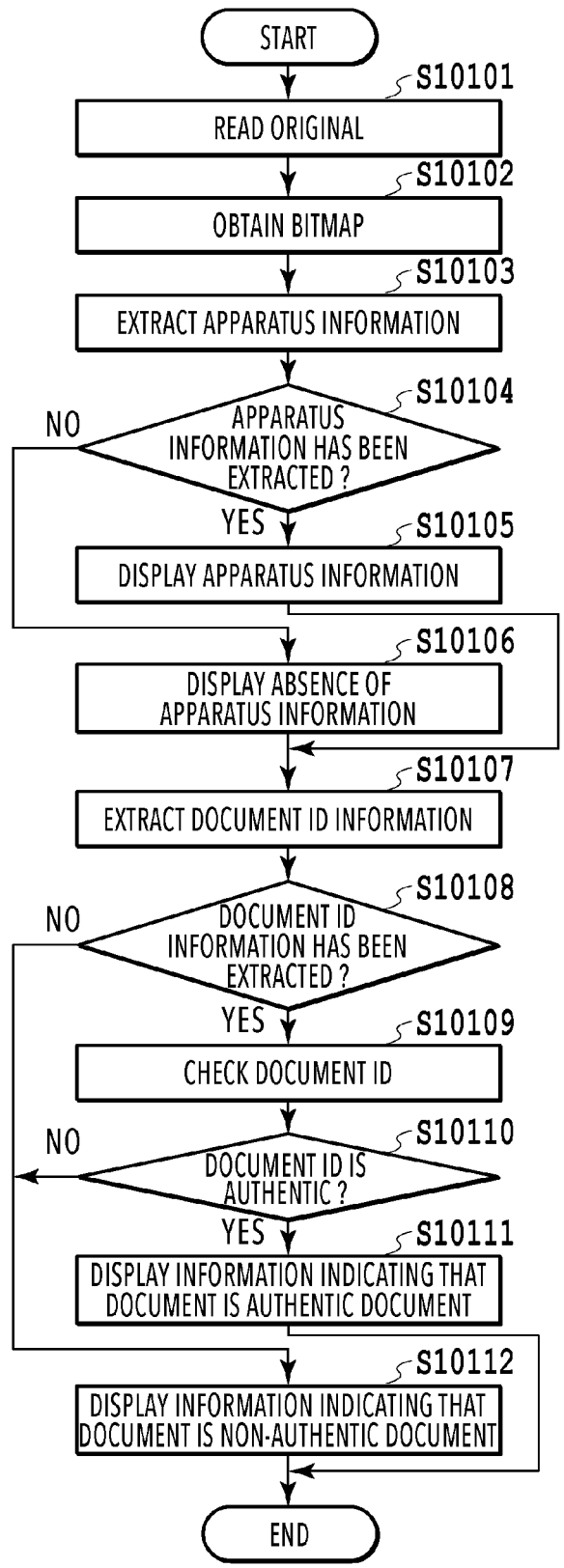

FIGS. 10A and 10B are flowcharts explaining an information embedding process and an information extracting process of the document ID, the apparatus information, and the watermark in the present embodiment. FIG. 10A is a flowchart of the information embedding process. FIG. 10B is a flowchart of the information extracting process. FIGS. 10A and 10B are processes separately and independently performed. As in the example described in FIGS. 3A and 3B, although description is given assuming that the MFP 10 performs the processes of FIGS. 10A and 10B, the host PC 50 may perform all processes illustrated in FIGS. 10A and 10B. The configuration may be such that the host PC 50 performs some of the processes illustrated in FIGS. 10A and 10B and the MFP 10 performs the other processes.

Since processes of S10001 to S10005 are the same as the processes of S3001 to S3005 in FIG. 3A, description thereof is omitted.

In S10006, the MFP 10 obtains the apparatus information. In the present embodiment, the apparatus information is information on the apparatus model name of the printing apparatus that performs the printing or on the print process such as the print mode. This information is information that is different from the aforementioned document ID and that is independent of the document contents, and is, for example, 256-bit information.

Next, in S10007, the MFP 10 performs the multiplexing process of further superimposing the apparatus information on the multiplexed image (first multiplexed image) generated in S10005. The multiplexing process of the apparatus information in S10007 is performed by using patterns for multiplexing of the apparatus information, unlike the multiplexing process of the document ID in S10005. The image on which the apparatus information is further multiplexed is also referred to as second multiplexed image.

FIGS. 11A and 11B are diagrams illustrating examples of masks used in the multiplexing process in S10007. In the present embodiment, the two masks of FIGS. 11A and 11B are used to generate "0" and "1" indicating the apparatus information. As a tone change method of the image, the same method as that described in S3005 may be used. The multiplexing is performed by applying the masks of FIGS. 11A and 11B to the B pixel values also for the apparatus information.

Figure 12A:
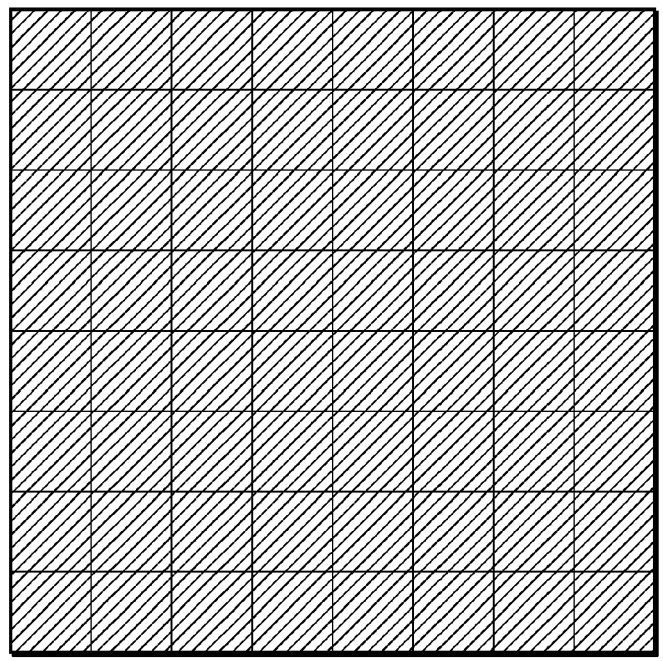
FIGS. 12A to 12B are diagrams visually illustrating patterns provided by the masks.
Figure 12B:
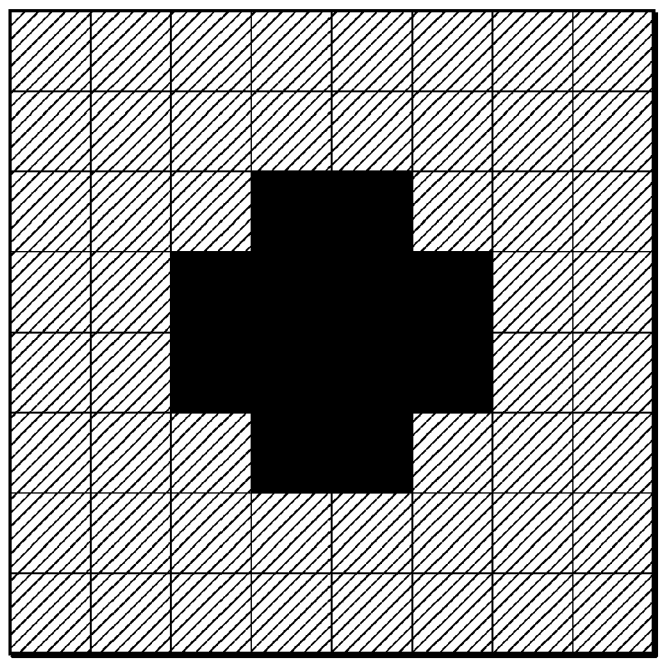

FIGS. 12A and 12B are diagrams visually illustrating patterns provided by the masks illustrated in FIGS. 11A and 11B. FIG. 12A corresponds to the mask of FIG. 11A, and FIG. 12B corresponds to the mask of FIG. 11B. In FIGS. 12A and 12B, positions of "−64" in the masks of FIGS. 11A and 11B are expressed by black pixels, and positions of "0" are expressed by oblique-line pixels. Presence or absence of dots formed of multiple pixels as in FIGS. 12A and 12B appears as a tone change result in the multiplexed image.

In an actual embedment pattern, the apparatus information may be embedded as it is or a pattern obtained by encoding the apparatus information may be embedded.

Figure 13B:
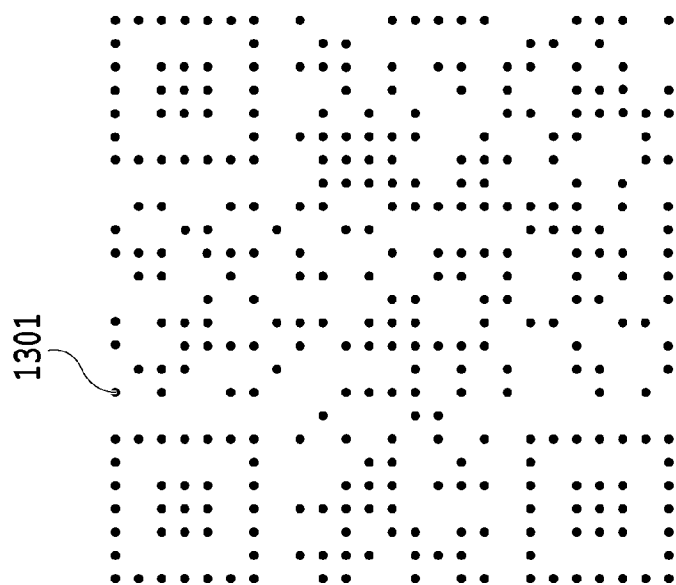
FIGS. 13A and 13B are diagrams illustrating examples of embedding of a pattern.
Figure 13A:
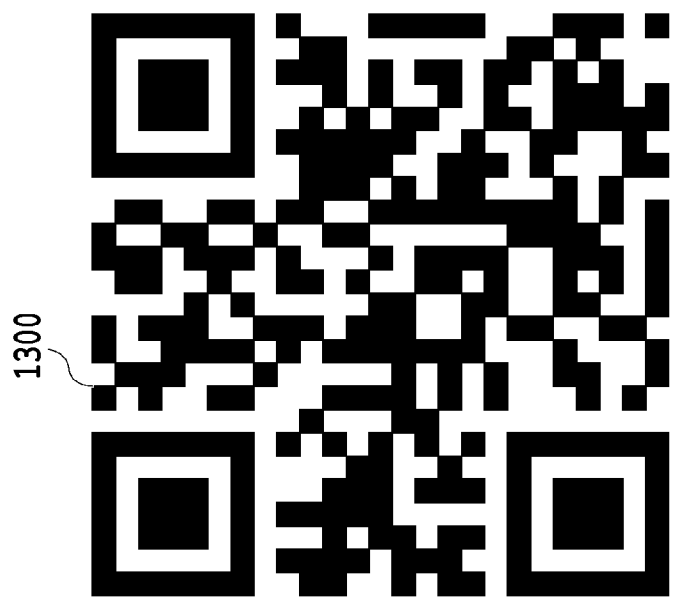

FIGS. 13A and 13B are diagrams illustrating an example of embedding of the pattern obtained by encoding the apparatus information. FIG. 13A is a diagram in which the apparatus information is encoded into a two-dimensional code. FIG. 13B illustrates an embedment pattern of FIG. 13A. The configuration may be such that a pattern such as a two-dimensional barcode as illustrated in FIG. 13A is printed by using the patterns expressing "0" and "1" illustrated in FIGS. 12A and 12B. FIG. 13B is an image printed by using the pattern expressing "1" in FIG. 12B at positions corresponding to the black pixels in the pattern of FIG. 13A.

The multiplexed image (second multiplexed image) in which the first information and the second information are embedded is thereby generated. Although the example of generating the multiplexed image by multiplexing the apparatus information in the image subjected to the multiplexing of the document ID is described in this section, the configuration is not limited to this. The multiplexed image may be generated by multiplexing the document ID in an image subjected to the multiplexing of the apparatus information. Moreover, the document ID and the apparatus information may be multiplexed in combination.

Since subsequent processes of S10008 and S10009 are the same as the processes of S3006 and S3007 in FIG. 3A, description thereof is omitted.

An original in which, for the document data, the document ID is embedded in the latent image region and the apparatus information is embedded in the entire page including the background region can be thereby printed on the print sheet. Note that, in S10007, the apparatus information may be embedded only in the latent image region excluding the background region. However, in this case, a density difference between the latent image region and the background region occurs in the print original, and functions as a watermark may decrease. Accordingly, the apparatus information is preferably embedded in the entire page including the background region.

Next, the reason why the document ID and the apparatus information are appropriately embedded in the case where both pieces of information are embedded in the document data is described below. First, with reference to the patterns of FIGS. 8A and 8B, it can be found that the patterns are drawn with oblique lines of 1 px (pixel). Similarly, with reference to the patterns of FIGS. 12A and 12B, it can be found that the patterns are drawn with an almost circle with a diameter of 4 px (pixels).

In this case, the patterns have the following features, as can be found from comparison between FIGS. 8A and 8B and FIGS. 12A and 12B.

In the patterns expressing "0" and "1" in FIGS. 8A and 8B, "the print densities are substantially the same" and "the directions of the formed thin lines express the values".

In the patterns expressing "0" and "1" in FIGS. 12A and 12B, "the magnitude of the print density expresses the value" and "there is no directionality in the formed patterns".

Figure 14A:
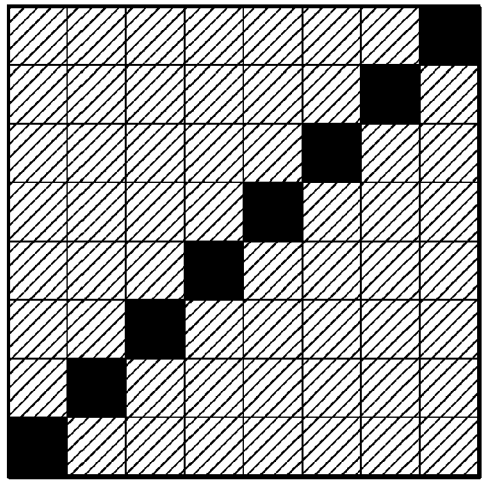
FIGS. 14A to 14D are diagrams illustrating results of performing multiplexing processes.
Figure 14B:
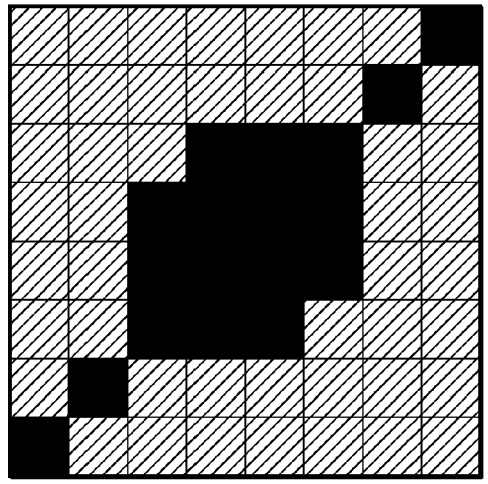
Figure 14C:
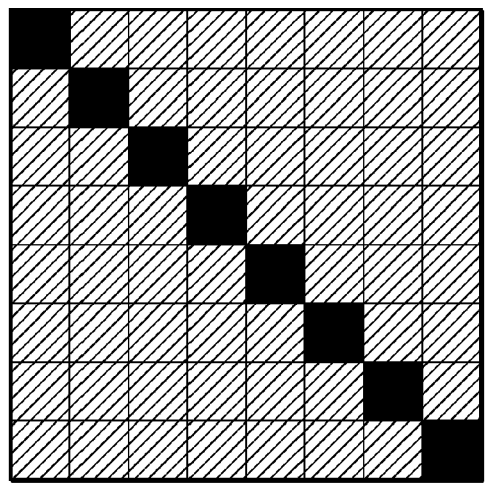
Figure 14D:
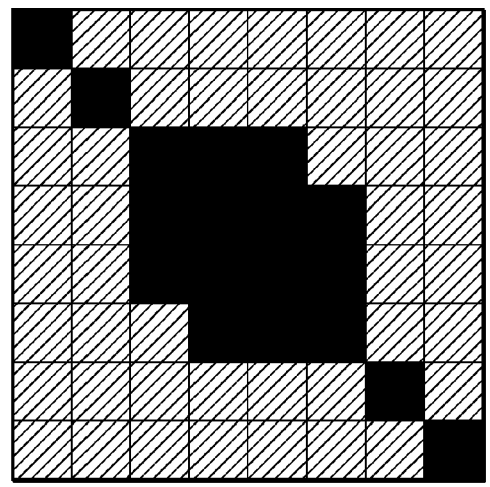

FIGS. 14A to 14D are diagrams illustrating a result of performing both multiplexing processes of the embedding of the document ID in S10005 and the embedding of the apparatus information in S10007. FIG. 14A is an example of a pattern in the case where the document ID is "0" as illustrated in FIG. 8A and the apparatus information is "0" as illustrated in FIG. 12A. FIG. 14B is an example of a pattern in the case where the document ID is "0" as illustrated in FIG. 8A and the apparatus information is "1" as illustrated in FIG. 12B. FIG. 14C is an example of a pattern in the case where the document ID is "1" as illustrated in FIG. 8B and the apparatus information is "0" as illustrated in FIG. 12A. FIG. 14D is an example of a pattern in the case where the document ID is "1" as illustrated in FIG. 8B and the apparatus information is "1" as illustrated in FIG. 12B.

In the comparison between FIG. 14A and FIG. 14B, such a relationship that the density of FIG. 14B is higher than the density of FIG. 14A is maintained. Similarly, in the comparison between FIG. 14C and FIG. 14D, such a relationship that the density of FIG. 14D is higher than the density of FIG. 14C is maintained. Accordingly, it is possible to reduce the case where the embedding process of the document ID damages the embedding of the apparatus information.

Moreover, in the comparison between FIG. 14A and FIG. 14B, the direction of the oblique lines is not changed from the direction "from the lower left side toward the upper right side". Similarly, in the comparison between FIG. 14C and FIG. 14D, the direction of the oblique lines is not changed from the direction "from the upper left side toward the lower right side". Accordingly, it is possible to reduce the case where the embedding process of the apparatus information damages the embedding of the document ID.

As described above, using the embedment patterns of the present embodiment can reduce loss of embedded information due to interference between the embedment patterns even in the case where the positions of the patterns embedded in the multiplexing process in S10005 and the multiplexing process in S10007 overlap each other.

The reduction of the loss of embedded information is independent of the types of the embedded information. Specifically, the processes work also in the case where the embedment patterns of the document ID and the apparatus information are interchanged. In other words, the following information embedding processes are performed.

An embedding process in which information is embedded by using mainly a direction of a printed shape (hereinafter, also referred to as "shape embedding")

An embedding process in which information is embedded by using mainly a magnitude of a printing density (hereinafter, also referred to as "density embedding")

Using two embedding processes for embedding of two types of information can reduce the loss of embedded information that may occur due to interference between the two embedding processes.

Moreover, satisfying the following conditions can increase the degree of reduction of interference between the two processes.

Unit size of shape embedding>print size of density embedding

Print size of density embedding>line width of shape embedding

The unit size of the shape embedding is, in the example of the present embodiment, an 8×8 pixel size that is the mask size (unit area) in FIGS. 7A and 7B. The print size of the density embedding is, in the example of the present embodiment, a 4×4 pixel size that is the black pixel size in FIG. 12B. In the case where the unit size of the shape embedding is smaller than the print size of the density embedding, one pattern of the shape embedding is completely overwritten by the density embedding. Accordingly, the loss of embedded information due to the interference between the two processes is large. Similarly, in the case where the print size of the density embedding is smaller than the line width (width of one pixel in the present embodiment) of the shape embedding, one pattern of the density embedding is completely overwritten by the shape embedding. Accordingly, the loss of embedded information due to the interference between the two processes is large. Thus, patterns satisfying the aforementioned conditions are preferably used.

Description has been given by using the example in which the two types of embedding are performed by using the ink of the same color. However, the ink color to be used for the shape embedding and that for the density embedding may be different ink colors. Using different ink colors can further reduce the interference between the two processes.

The reason why the interference can be reduced by using different ink colors is described below. Each of the ink colors used in the printing is designed to mainly absorb the following color(s).

C ink: red color (R)
M ink: green color (G)
Y ink: blue color (B)
K ink: all colors (RGB)

For example, assume a case where the shape embedding is performed with the C ink and the density embedding is performed with the Y ink. In this case, extracting information as described below in an RGB image read with a scanner can reduce the interference between the two pieces of embedded information.

Extracting the shape-embedded information from R channel information

Extracting the density-embedded information from B channel information Note that, since the actual inks absorb colors other than those described above, the interference cannot be completely eliminated, but can be at least reduced from that in the case where the ink of the same color is used. Accordingly, combining this technique with the aforementioned interference reduction effect of using the shape embedding and the density embedding can further reduce the interference.

Moreover, the information embedding processes may be performed by using the K ink. However, the K ink absorbs all colors. Accordingly, for the example, the shape embedding is performed with the K ink while the density embedding is performed with the Y ink. Extracting information as described below in an RGB image read with a scanner can reduce the interference of the Y ink used for the density embedding with the shape embedding.

The shape-embedded information is extracted from an R channel or a G channel.

Combining this technique with the aforementioned interference reduction effect of using the shape embedding and the density embedding can further reduce the interference. Note that, since the K ink used in the shape embedding also absorbs the blue color, the interference with the density embedding cannot be reduced. In this case, the interference reduction effect of using different ink colors cannot be obtained, and the aforementioned interference reduction effect of using the shape embedding and the density embedding is obtained.

It is generally known that using different ink colors can reduce the interference between multiple embedding processes. However, in the case where the black ink is used in one of the information embedding processes and the black ink overlaps an ink of another color, information printed with the ink of the other color is damaged and reduction of the interference is difficult. However, using the density embedding and the shape embedding in the two types of embedding processes as in the present embodiment can reduce the case where the black ink damages the embedded information printed with the ink of the other color. Accordingly, it is possible to obtain the effect of reducing the loss of embedded information due to the interference.

As can be understood from comparison between FIGS. 14B and 8A and between FIGS. 14D and 8B, in the eight pixels used in the shape embedding in each of FIGS. 8A and 8B, the number of shape embedding pixels superimposed on the density embedding pixels is only two. Accordingly, in the case where the density embedding is performed with the black ink and the shape embedding is performed with the yellow ink, a percentage of the pixels interfered by the density embedding in the shape embedding process pixels is suppressed to 25% (two pixels out of eight pixels).

Meanwhile, in the case where the shape embedding is performed with the black ink and the density embedding is performed with the yellow ink, a percentage of the pixels interfered by the shape embedding in the density embedding process pixels is suppressed to 20% (two pixels out of twelve pixels).

Moreover, the aforementioned percentages of the interfered pixels are the same also in the case where the shape embedding and the density embedding are both performed with the ink of the same color such as the black ink.

Although the example in which the tone change is performed on the B pixel values in the RGB pixel values is described in the present embodiment, a method in which the tone change is performed on the CMYK pixel values may be used. In this case, the paper white is Y=0, M=0, C=0, and K=0, and the tone change with respect to the paper white needs to take a positive value. Accordingly, it is only necessary to invert the signs of the tone change values illustrated in FIGS. 7A, 7B, and 7C. Specifically, it is only necessary to invert the tone change value of −64 to +64 and invert the tone change value of +64 to −64. The same applies to the signs of the tone change values illustrated in FIGS. 11A and 11B.

The method in which the tone change is performed on the CMYK pixel values provides higher controllability in the case where the ink to be applied to the paper white is limited only to the Y ink. Meanwhile, the method in which the tone change is performed on the RGB pixel values provides higher controllability of suppressing changes in color hues in the case where information is embedded in the image portion. Accordingly, it is preferable to select a preferable tone change method depending on the characteristics of print processes such as electrophotographic or inkjet, ratios of paper white, character, and image regions in the document, and the like.

Moreover, although the tone change value is 64 in the present embodiment, the tone change value is not limited to this. In order to clearly control the dot shape or to align the print patterns between the inkjet printing methods or the electrophotographic print methods, it is effective to increase the tone change value. For example, setting the tone change value around 255 is effective. Moreover, in the case where the print density on a paper surface is desired to be reduced, the pattern size that is 8×8 pixels in the present embodiment may be increased. Alternatively, the tone change values of FIGS. 7A and 7B may be arranged in, for example, patterns forming broken lines instead of the solid lines. For example, a pattern of "repetition of three pixels with a pixel value of −255 and one pixel with a pixel value of −0" may be used. A pattern of "repetition of two pixels with a pixel value of −255 and two pixels with a pixel value of −0" may be also used. Similarly, the tone change values of FIGS. 11A and 11B may be arranged in such a pattern that the tone change values in FIGS. 11A and 11B are partially absent. For example, a pattern in which "one pixel in every four pixels is set to 0" may be used. Moreover, a pattern in which "half of the pixels are set to 0 in a checkerboard pattern" may be used. Any two or more of the patterns may be combined. It only necessary that the patterns can maintain the following relationships in the two types of embedding processes.

An embedding process in which information is embedded by using mainly a direction of a printed shape An embedding process in which information is embedded by using mainly a magnitude of printing density Embedding the patterns maintaining the relationships described above can reduce the loss of embedded information due to the interference between the processes.

Next, description is given of the information extracting process of extracting the first information and the second information from the print original in which these pieces of information are embedded as described above. As described above, FIG. 3B is the flowchart illustrating an example of the information extracting process. Since processes of S10101 and S10102 are the same as the processes of S3101 to S3102, description thereof is omitted.

Next, in S10103, the MFP 10 extracts the multiplexed apparatus information from the bitmap image. As an extraction method, the MFP 10 determines which one of the patterns of FIGS. 12A and 12B is printed in the unit of 8×8 pixels, and takes out information of "0" or "1". Repeating this process decodes the multiplexed apparatus information. Note that, in the case where the apparatus information is converted to a two-dimensional barcode shape as illustrated in FIGS. 13A and 13B and embedded in S10007, a process of decoding the extracted two-dimensional barcode pattern is also performed in S10103.

Next, in S10104, the MFP 10 determines whether the apparatus information has been extracted. In the case where the determination result is yes, the MFP 10 proceeds to S10105, displays the extracted apparatus information, and proceeds to S10107. In the case where the determination result is no, the MFP 10 proceeds to S10106, displays information indicating that "apparatus information is absent", and proceeds to S10107. Since subsequent processes S10107 to S10112 are the same as the processes of S3103 to S3108, description thereof is omitted.

Next, description is given of an example of appropriately extracting the first information and the second information from a print original in which the first information and the second information are embedded. In the present embodiment, in the extraction of the apparatus information in S10103, accuracy of the extraction can be improved by performing determination using "magnitude of density" that is a difference between FIGS. 12A and 12B.

FIG. 15 is a diagram illustrating an example of a filter used in the extraction of the density-embedded information. In the extraction of the apparatus information, a 3×3 blur filter as illustrated in FIG. 15 is applied to the bitmap image obtained in S10102 from the original read in S10101. Although the filter is preferably applied to the image subjected to all of the MTF correction, the input correction, the shading correction, and the color conversion as described above, the filter may be applied to the image at the point where the correction is partially completed. In the present explanation, each of the patterns in FIGS. 14A to 14D is used as the read image. The black pixels in FIGS. 14A to 14D are assumed to express pixels having the maximum density (assumed to be 1.0 in relative value), and oblique-line pixels in FIGS. 14A to 14D are assumed to express pixels having the density of paper white, that is the minimum density (assumed to be 0.0 in relative value).

Figure 16A:
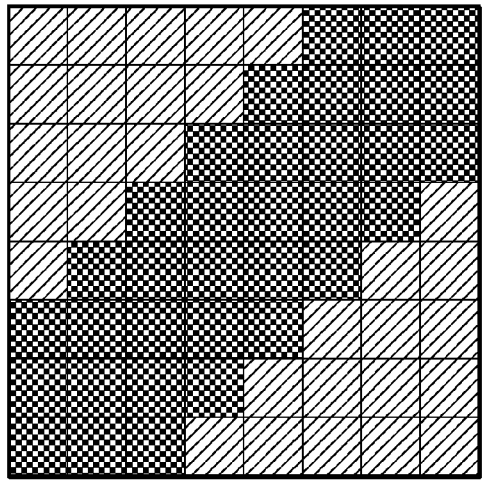
FIGS. 16A to 16D are diagrams illustrating examples of results in the case where the filter is applied.
Figure 16B:
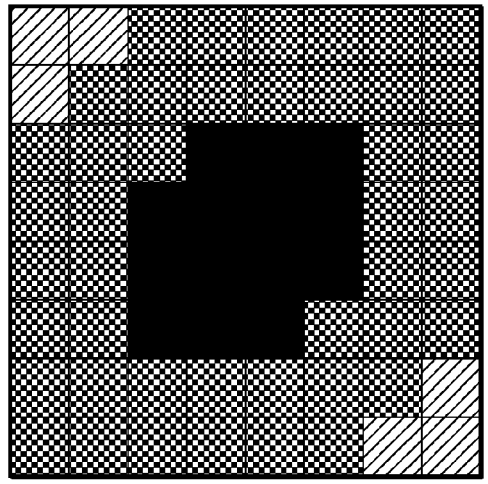
Figure 16C:
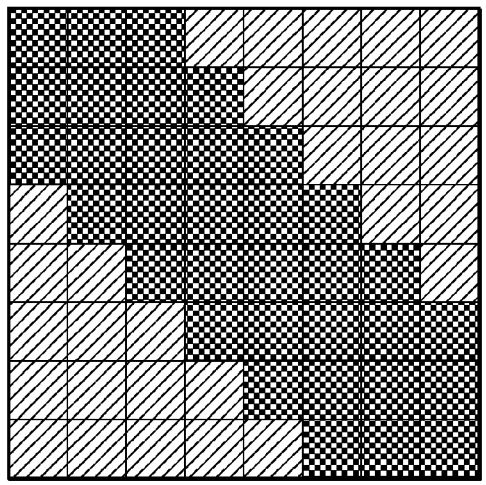
Figure 16D:
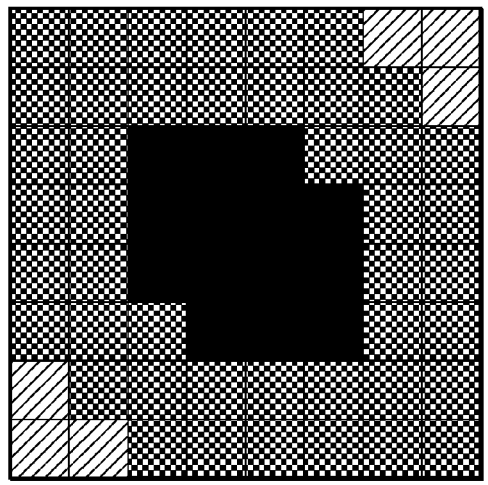

FIGS. 16A to 16D are examples of results in the case where the blur filter of FIG. 15 is applied to the patterns of FIGS. 14A to 14D, respectively. Specifically, FIGS. 16A to 16D are diagrams illustrating examples in the case where the blur filter of FIG. 15 is applied to FIGS. 14A to 14D, respectively. In FIGS. 16A to 16D, the black pixels express pixels whose density after the filter application is 5/9 or higher. Specifically, each black pixel expresses a pixel for which five or more pixels among nine pixels, including the pixel of interest and the pixels therearound, are the black pixels in FIGS. 14A to 14D. In FIGS. 16A to 16D, the oblique-line pixels express the paper white pixels. In FIGS. 16A to 16D, checkerboard-pattern pixels express pixels that have intermediate density between the black pixels and the oblique-line pixels and whose density after the filter application is 1/9 or more and 4/9 or less. With reference to FIGS. 16A and 16C, it can be found that the lines of the shape embedding are all checkerboard-pattern pixels due to the blur filter. Moreover, with reference to FIGS. 16B and 16D, it can be found that the pixels of the density embedding are the black pixels. Furthermore, in FIGS. 16B and 16D, part of the lines of the shape embedding are the black pixels. Meanwhile, in FIGS. 16A and 16C, the pixels of the lines of the shape embedding are not black pixels and do not have density as high as those in FIGS. 16B and 16D. Accordingly, it is possible to stably distinguish FIGS. 16A and 16B from each other and FIGS. 16C and 16D from each other.

Meanwhile, in the extraction of the document ID in S10107, accuracy of the extraction can be improved by performing determination using the "direction of the shape" that is a difference between FIGS. 8A and 8B.

FIGS. 17A and 17B are diagrams illustrating examples of filters used in the extraction of the shape-embedded information. In the extraction of the document ID, 3×3 detection filters as illustrated in FIGS. 17A and 17B are applied to the bitmap image read in S10101 and obtained in S10102. Although the filters are preferably applied to the image subjected to all of the MTF correction, the input correction, the shading correction, and the color conversion as described above, the filters may be applied to the image at the point where the correction is partially completed. Also in the present explanation, each of the patterns in FIGS. 14A to 14D is used as the read image.

FIGS. 18A to 18D are diagrams illustrating examples of results in the case where the filter of FIG. 17A is applied to the patterns of FIGS. 14A to 14D, respectively. Specifically, FIGS. 18A to 18D are examples in the case where the filter of FIG. 17A is applied to FIGS. 14A to 14D, respectively. FIGS. 19A to 19D are diagrams illustrating examples of results in the case where the filter of FIG. 17B is applied to the patterns of FIGS. 14A to 14D, respectively. Specifically, FIGS. 19A to 19D are examples in the case where the filter of FIG. 17B is applied to FIGS. 14A to 14D, respectively. In the present embodiment, in the extraction of the document ID, each of the filter of FIG. 17A and the filter of FIG. 17B is applied.

In FIGS. 18A to 18D, each of the black pixels expresses a pixel whose density after the filter application is 3/3. The pixel whose density is 3/3 is such a pixel that three pixels in which a coefficient of 1/3 is arranged are all black pixels. In FIGS. 18A to 18D, oblique-line pixels express the paper white pixels. Moreover, in FIGS. 18A to 18D, checkerboard-pattern pixels express pixels that have intermediate density between the black pixels and the oblique-line pixels and whose density after the filter application is 1/3 or more and 2/3 or less.

Figure 18A:
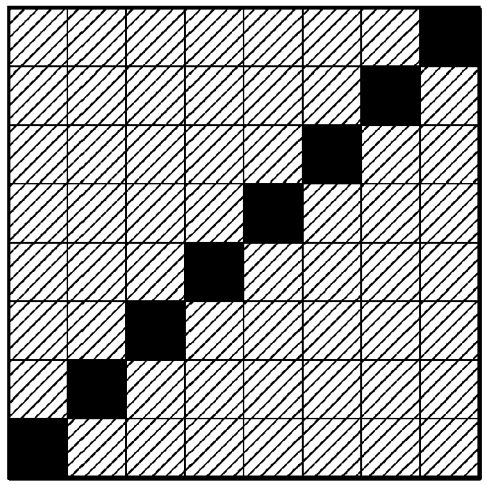
FIGS. 18A to 18D are diagrams illustrating examples of results in the case where the filter is applied.
Figure 18B:
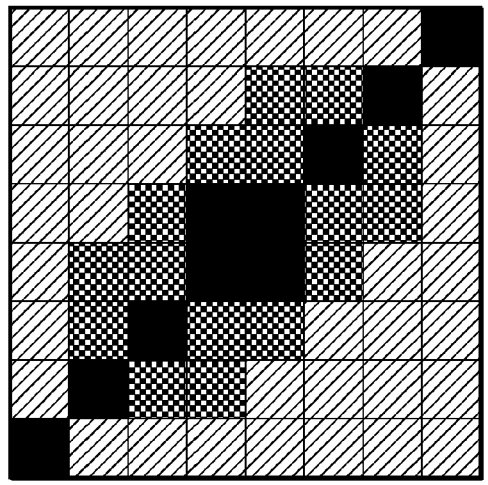
Figure 18C:
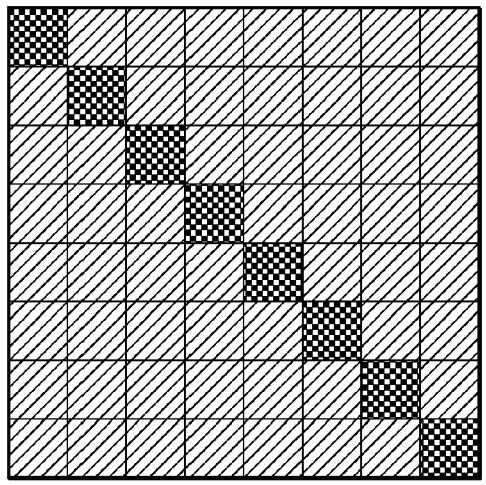
Figure 18D:
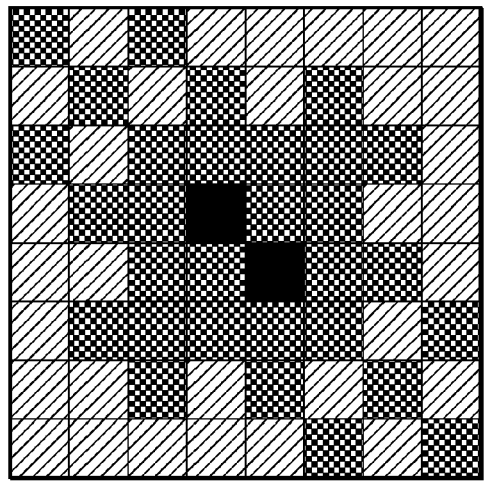

With reference to FIGS. 18A and 18B, the lines of the shape embedding are all black pixels due to the detection filter of FIG. 17A. Moreover, some of the pixels in FIG. 18B are the black pixels due to an effect of the density embedding. Meanwhile, in FIGS. 18C and 18D, almost all pixels in the lines of the shape embedding and the density embedding are the checkerboard-pattern pixels.

Figure 19A:
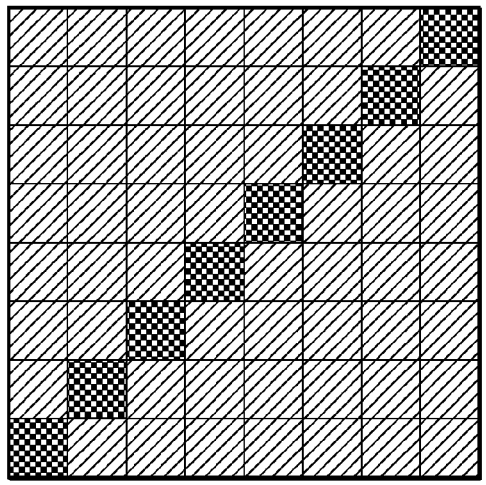
FIGS. 19A to 19D are diagrams illustrating examples of results in the case where the filter is applied.
Figure 19B:
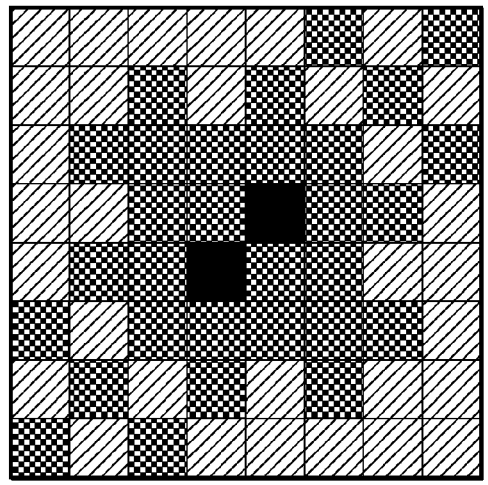
Figure 19C:
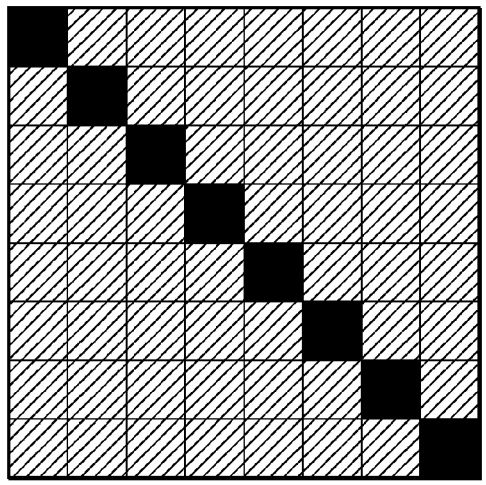
Figure 19D:
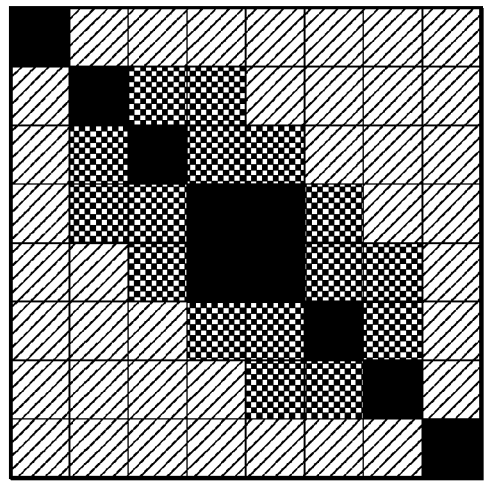

Next, with reference to FIGS. 19A and 19B, almost all pixels in the lines of the shape embedding and the density embedding are the checkerboard-pattern pixels due to the detection filter of FIG. 17B. Meanwhile, with reference to FIGS. 19C and 19D, all pixels in the lines of the shape embedding are the black pixels. The following can be found based on the above facts.

The blur filter is used to stably extract the density-embedded information.

The filters matching the embedded shapes are used to stably extract the shape-embedded information.

Performing the processes as described above enables stable extraction of two different types of embedded information that are the apparatus information and the document ID.

Although two types of information of the document ID and the apparatus information have been heretofore used as the two types of embedded information in the present embodiment, the embedded information is not limited to these two types of information, and the present embodiment can be applied to embedding of any information.

Examples of the first information and the second information are listed below.

| First Information | Second Information |
| --- | --- |
| Encoded document ID | Encoding password |
| Document ID | External PC information for document ID checking |
| Document ID | User information |
| Encoded apparatus information | Encoding password |

It is only necessary to density-embed one of the first information and the second information and shape-embed the other one.

Moreover, although the example in which the density embedding and the shape embedding are executed in the same pattern size is described to facilitate the understanding, the present embodiment is not limited to the case where the same pattern size is used. As described above, the pattern sizes themselves may be vary as long as the following conditions are satisfied.

Unit size of shape embedding>print size of density embedding

Print size of density embedding>line width of shape embedding

Moreover, the configuration may be such that the host PC 50 performs the embedding process of the first information and the MFP 10 performs the embedding process of the second information. This is an efficient process in the following situation.

The document ID and the like are managed in the host PC or the external PC.

The apparatus information and the like are managed in the MFP 10.

Moreover, the configuration may be such that the host PC 50 performs the extracting process of the first information and the MFP 10 performs the extracting process of the second information. This is an efficient process in the following situation.

The document ID and the like are managed in the host PC or the external PC.

The apparatus information and the like are managed in the MFP 10.

Moreover, the information embedding process and the information extracting process performed in the host PC 50 may be performed in the external PC or the like via the network I/F 507 in FIG. 1. Examples of this operation are described below.

Example 1: In S10004 of FIG. 10A, the host PC 50 makes a multiplexing process request to the external apparatus (external PC), and sends the document ID and the document data to the external PC. The external PC sends the multiplexed information (multiplexed image) obtained by multiplexing the document ID to the host PC 50.

Example 2: In S10107 of FIG. 10B, the host PC 50 makes an extracting process request to the external PC, and sends original read data to the external PC. The external PC extracts the document ID from the original read data, and sends the document ID to the host PC 50.

Similarly, requests to perform the apparatus information embedding in S10006 of FIG. 10A and the apparatus information extraction in S10103 of FIG. 10B may be made to the external PC. Making a request to partially perform the series of processes to the external PC as described above can reduce processing loads of the host PC 50 and the MFP 10.

Moreover, in the present embodiment, description is given by using the process of performing the pattern matching as an example of the process of extracting the shape-embedded information. However, the extraction method is not limited to this process, and the extraction may be performed by using various methods such as a method of performing spatial frequency analysis and determining whether an analyzed image has a peak at a specific frequency in a specific direction. Any mode may be employed as long as there is maintained a state where the shape of the density embedding is set to have no strong peak in the specific direction and the shape of the shape embedding is set to have a peak in the specific direction. Setting the shape of the density embedding and the shape of the shape embedding such that the shape of the density embedding has no strong peak in the specific direction and the shape of the shape embedding has a peak in the specific direction enables stable extraction of the shape-embedded information also in the case where the density embedding and the shape embedding are superimposed one on top of the other.

As described above, according to the present embodiment, it is possible to embed multiple types of information in the print original without use of a special configuration. Moreover, it is possible to extract multiple types of information from the print original without use of a special configuration.

<<Other Embodiments>>

In the embodiments described above, description is given by using the MFP 10 including both of the printing unit and the reading unit as an example, but the present disclosure is not limited to this. A printer including the printing unit and a scanner including the reading unit may be used. Specifically, the configuration may be such that the aforementioned print process is performed in a printer that is a single function printer (SFP) and the read process is performed in a scanner that is separate from the printer. Moreover, the print process and the read process may be performed in separate apparatuses also in the mode using the MFP 10, as a matter of course.

Moreover, although description is given of the example in which the information embedded in the multiplexing process is the first information and the second information, the types of information may be increased within a readable range. Specifically, the information embedded in the multiplexing process of the embodiments described above may be multiple types of information.

Furthermore, in the aforementioned example, description is given of the example in which, in the embedding process, the document ID is embedded and then the apparatus information is embedded and, in the extracting process, the apparatus information is extracted and then the document ID is extracted. However, the order is not limited to this. Similarly, although description is given of the example in which, in the embedding process, the shape embedding process is performed and then the density embedding process is performed and, in the extraction process, the density-embedded information is extracted and then the shape-embedded information is extracted, the order is not limited to this.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-035511, filed Mar. 8, 2022, which is hereby incorporated by reference wherein in its entirety.

What is claimed is:

1. An image processing apparatus comprising:
   at least one processor;
   at least one memory storing instructions that, when executed by the at least one processor, cause the image processing apparatus to:

obtain data corresponding to an original image;

obtain region information indicating a first region and a second region, the first region indicating an area of a print original that, when the print original is read, should have a first density and the second region indicating an area of the print original that, when the print original is read, should have a second density that is lower than the first density;

perform a first embedding of first information in the data corresponding to the original image by embedding a pattern with directivity in the first region and embedding, in the second region, another pattern in which the number of pixels printed adjacent to printed pixels is smaller than the number of pixels printed adjacent to printed pixels in the pattern with directivity, wherein the first embedding is performed by generating a first multiplexed image created by embedding the pattern with directivity in the first region using a first method and by embedding, in the second region, the another pattern in which the number of pixels printed adjacent to printed pixels is smaller than the number of pixels printed adjacent to printed pixels in the first region, the first method being a method in which a shape of the pattern with directivity is changed;

perform a second embedding of second information in the data corresponding to the original image, the second information being a different type of information from the first information embedded by the first embedding, wherein the second embedding is performed by generating a second multiplexed image created by embedding the second information in the first multiplexed image using a second method, the second method being a method in which both a density and a shape of pattern are changed; and control outputting of the print original by using the second multiplexed image; and a printer that prints the print original on a recording medium.

2. The image processing apparatus according to claim 1, wherein a plurality of patterns with directivity are embedded in the first region, and densities of the plurality of patterns with directivity in a unit area are the same.

3. The image processing apparatus according to claim 1, wherein the at least one processor, upon executing the stored instructions, further causes the image processing apparatus to perform the first embedding to embed a plurality of patterns with directivity in the first region, and perform a process with a unit area corresponding to each of the patterns with directivity embedded in the first region set as a unit to be processed, and embed the information in the first region in a case where an area to be processed is entirely included in the first region.

4. The image processing apparatus according to claim 1, wherein the first embedding embeds the first information in each of divided regions obtained by dividing the data corresponding to the original image.

5. The image processing apparatus according to claim 1, wherein the first embedding determines a region in which the information is embeddable in the first region of the original image, and embeds the information in the determined region.

6. The image processing apparatus according to claim 5, wherein the first embedding further embeds a mark indicating the determined region.

7. The image processing apparatus according to claim 1, wherein a unit size of the pattern with directivity formed using the first method is larger than a print size of a print pattern formed using the second method.

8. The image processing apparatus according to claim 1, wherein the pattern having directivity formed using the first method is a line and a width of the line is smaller than a width of a print pattern formed using the second method.

9. The image processing apparatus according to claim 1, wherein a color to which the first method is applied and a color to which the second method is applied are different.

10. The image processing apparatus according to claim 9, wherein the original image is an image formed of RGB pixel values, the first method is applied to all of the RGB pixel values, and the second method is applied to B pixel values among the RGB pixel values.

11. The image processing apparatus according to claim 9, wherein the original image is an image formed of RGB pixel values, the first method is applied to B pixel values among the RGB pixel values, and the second method is applied to all of the RGB pixel values.

12. The image processing apparatus according to claim 9, wherein the original image is an image formed of CMYK pixel values, the first method is applied to K pixel values among the CMYK pixel values, and the second method is applied to Y pixel values or the K pixel values among the CMYK pixel values.

13. The image processing apparatus according to claim 1, wherein a color to which the first method is applied and a color to which the second method is applied are the same.

14. The image processing apparatus according to claim 13, wherein the original image is an image formed of RGB pixel values, and the first method and the second method are applied to B pixel values among the RGB pixel values.

15. The image processing apparatus according to claim 13, wherein the original image is an image formed of CMYK pixel values, and the first method and the second method are applied to Y pixel values or K pixel values among the CMYK pixel values.

16. An image processing apparatus according to claim 1, wherein the second method includes selectively embedding, in accordance with the second information, one of a first predetermined pattern having a first predetermined density and a second predetermined pattern having a second predetermined density lower than the first predetermined density.

17. An image processing apparatus according to claim 16, wherein the second method selectively embeds the first predetermined pattern and the second predetermined pattern in both the first region and the second region.

18. An image processing method performed by at least one processor in an image processing apparatus, the method comprising:

performing, using the at least one processor;
obtaining data corresponding to an original image;
obtaining region information indicating a first region and a second region, the first region indicating an area of a print original that, when the print original is read, should have a first density, and the second region indicating an area of the print original that, when the print original is read, should have a second density that is lower than the first density;
embedding first information in the data corresponding to the original image by embedding a pattern with directivity in the first region and embedding, in the second region, another pattern in which the number of pixels printed adjacent to printed pixels is smaller than the number of pixels printed adjacent to printed pixels in the pattern with directivity,
wherein the first information is embedded by generating a first multiplexed image created by embedding the pattern with directivity in the first region using a first method and by embedding, in the second region, the another pattern in which the number of pixels printed adjacent to printed pixels is smaller than the number of pixels printed adjacent to printed pixels in the pattern with directivity, the first method being a method in which a shape of the pattern with directivity is changed;
embedding second information in the data corresponding to the original image, the second information being a different type of information from the first information,
wherein the second information is embedded by generating a second multiplexed image created by embedding the second information in the first multiplexed image using a second method, the second method being a method in which both a density and a shape of a pattern are changed;
performing control of outputting the print original by using the second multiplexed image; and
printing the print original on a recording medium.

* * * * *